(12) United States Patent
Michelson et al.

(10) Patent No.: US 7,009,976 B1
(45) Date of Patent: Mar. 7, 2006

(54) METHOD AND APPARATUS FOR USING BARRIER PHASES TO SYNCHRONIZE PROCESSES AND COMPONENTS IN A PACKET SWITCHING SYSTEM

(75) Inventors: Jonathan E. Michelson, Sunnyvale, CA (US); John J. Williams, Jr., Pleasanton, CA (US); Thomas Dejanovic, Sunnyvale, CA (US); John Andrew Fingerhut, Campbell, CA (US)

(73) Assignee: Cisco Technology, Inc., San Jose, CA (US)

(*) Notice: Subject to any disclaimer, the term of this patent is extended or adjusted under 35 U.S.C. 154(b) by 894 days.

(21) Appl. No.: 09/894,201

(22) Filed: Jun. 27, 2001

Related U.S. Application Data

(63) Continuation-in-part of application No. 09/752,422, filed on Dec. 31, 2000.

(51) Int. Cl.
*H04L 12/56* (2006.01)
(52) U.S. Cl. .................... 370/394; 370/230; 370/360
(58) Field of Classification Search ............. 370/230, 370/360, 388, 394
See application file for complete search history.

(56) References Cited

U.S. PATENT DOCUMENTS

| | | | |
|---|---|---|---|
| 4,491,945 A | 1/1985 | Turner | |
| 4,494,230 A | 1/1985 | Turner | |
| 4,630,260 A | 12/1986 | Toy et al. | |
| 4,734,907 A | 3/1988 | Turner | |
| 4,829,227 A | 5/1989 | Turner | |
| 4,849,968 A | 7/1989 | Turner | |
| 4,893,304 A | 1/1990 | Giacopelli et al. | |
| 4,901,309 A | 2/1990 | Turner | |
| 5,127,000 A | 6/1992 | Henrion | |
| 5,173,897 A | 12/1992 | Schrodi et al. | |
| 5,179,551 A | 1/1993 | Turner | |
| 5,179,556 A | 1/1993 | Turner | |
| 5,229,991 A | 7/1993 | Turner | |
| 5,253,251 A | 10/1993 | Aramaki | |
| 5,260,935 A | 11/1993 | Turner | |
| 5,339,311 A | 8/1994 | Turner | |
| 5,396,491 A * | 3/1995 | Newman | ............... 370/355 |
| 5,402,415 A | 3/1995 | Turner | |

(Continued)

OTHER PUBLICATIONS

David A. Patterson & John L. Hennessy, "Computer Organization and Design: the Hardware/Software Interface," 1998, Morgan Kaufmann Publisher, Inc., pp. 710-726 & G-1.

(Continued)

*Primary Examiner*—Chi Pham
*Assistant Examiner*—Rhonda Murphy
(74) *Attorney, Agent, or Firm*—The Law Office of Kirk D. Williams

(57) ABSTRACT

Methods and apparatus are disclosed for using barrier phases to synchronize processes and components in a packet switching system, including, for example, but not limited to the use of barrier phases in the coordinated timing of the sending of information (e.g., flow control information) within a packet switching system, and the use of barrier phases in a packet sequence number windowing protocol. In one implementation, elements are assigned to one of multiple ordered sets of a barrier groups, wherein each element of a barrier group must be set to a common barrier state before any element of a next a barrier group can switch to a next barrier state, and once all elements of a particular barrier group switch to a new barrier state, all the elements of the next barrier group begin to switch to the next barrier state.

17 Claims, 31 Drawing Sheets

U.S. PATENT DOCUMENTS

| | | | |
|---|---|---|---|
| 5,463,620 A * | 10/1995 | Sriram | 370/412 |
| 5,838,677 A | 11/1998 | Kozaki et al. | |
| 5,842,040 A | 11/1998 | Hughes et al. | |
| 6,061,345 A * | 5/2000 | Hahn et al. | 370/351 |
| 6,285,679 B1 * | 9/2001 | Dally et al. | 370/413 |
| 6,418,477 B1 | 7/2002 | Verma | |
| 6,438,137 B1 | 8/2002 | Turner et al. | |
| 6,532,211 B1 | 3/2003 | Rathonyi et al. | |
| 6,654,342 B1 | 11/2003 | Dittia et al. | |
| 6,638,850 B1 | 1/2004 | Dunning et al. | |
| 6,735,173 B1 | 5/2004 | Lenoski et al. | |
| 6,760,307 B1 | 7/2004 | Dunning et al. | |
| 6,870,831 B1 * | 3/2005 | Hughes et al. | 370/352 |
| 6,870,838 B1 | 3/2005 | Dally | |
| 2001/0033569 A1 * | 10/2001 | Dally | 370/369 |

OTHER PUBLICATIONS

Jonathan S. Turner, "An Optimal Nonblocking Multicast Virtual Circuit Switch," Jun. 1994, Proceedings of Infocom, 8 pages.

Chaney et al., "Design of a Gigabit ATM Switch," Feb. 5, 1996, WUCS-96-07, Washington University, St. Louis, MO, 20 pages.

Turner et al., "System Architecture Document for Gigabit Switching Technology," Aug. 27, 1998, Ver. 3.5, ARL-94-11, Washington University, St. Louis, MO, 110 pages.

U. S. Appl. No. 09/752,422, Dec. 21, 2000, Williams et al.

* cited by examiner

METHOD AND APPARATUS FOR USING BARRIER PHASES TO SYNCHRONIZE PROCESSES AND COMPONENTS IN A PACKET SWITCHING SYSTEM

CROSS-REFERENCE TO RELATED APPLICATIONS

This is a continuation-in-part of copending nonprovisional application Ser. No. 09/752,422, filed Dec. 31, 2000, which is hereby incorporated by reference.

FIELD OF THE INVENTION

This invention relates to a packet switching system of communications systems, routers, computers and communications devices; and more particularly, the invention relates to using barrier phases to synchronize processes and components in a packet switching system, including, for example, but not limited to the use of barrier phases in the coordinated timing of the sending of information within a packet switching system, and the use of barrier phases in a packet sequence number windowing protocol.

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology.

Packet switching systems, like most systems, include many subsystems which must work in a coordinated fashion for the overall system to operate. In fact, certain functions may require a common timing reference or at least some level of synchronization to operate properly, and some functions may be able to take advantage of the synchronization to operate more efficiently. Depending on the size and capacity of a particular switching system, components of the switching system may be distributed across several components, boards, subsystems, cabinets, rooms, or even remotely located. In many of these configurations, a common timing strobe is infeasible. Desired are improved methods and systems for synchronizing components of communications and computer systems.

Moreover, consumers and designers of these packet switching systems typically desire high reliability and increased performance at a reasonable price. Commonly used techniques for helping to achieve these goals are for these systems to perform some level of flow control to avoid certain congestion conditions, and to provide multiple paths between a source and a destination.

In packet switching systems which provide multiple paths between a source and a destination, packets of information are typically distributed among, and routed over these multiple paths. It is typically more cost-effective to provide multiple slower rate links or switching paths, than to provide a single higher rate path. Such designs also achieve other desired performance characteristics. However, a typical artifact of routing across multiple links of varying delays is the need to resequence each of the streams of packets routed through a packet switch back into their original order.

One known technique for routing and resequencing streams of packets is to add a sequence number to each packet and then to place packets in sequential order based on these added sequence numbers. Separate sequence numbers are typically used for each switch input-output pairing. For example, each input interface of the packet switch maintains a separate sequence number counter for each output of the packet switch; and each output interface of the packet switch maintains a separate counter for each input of the packet switch. This technique is simple, but it requires significant resources for the buffers and sequence number counters. The resources required for these buffers and counters must be sufficient to store the packets and distinguish the order of the packets for handling worst case delay differentials between paths. This problem is further compounded when contiguous sequence numbers are not used or when a packet is lost or dropped. In either of these cases, it is hard to determine whether certain packets should be forwarded immediately or should be delayed to see if a potentially dropped or lost packet or a packet with the skipped sequence number actually arrives. Desired are improved methods and systems for routing and resequencing packets in a packet switch, especially those methods and systems which place a bound on the size requirements of sequence numbers or other resources.

Packet switching systems typically monitor and maintain certain fundamental characteristics and information concerning their operation, such as packet counts and buffer occupancies of queues and other elements in distributed locations in a packet switching system. These characteristics, either natively or after manipulation, (herein also referred to as, and included in the extensible term "flow control information"), can be used to identify potential congestion and other traffic and switch conditions, which may then be used to make flow control decisions and generate reactive signals or messages to decrease or eliminate the potential or actual problem conditions.

However, before such flow control decisions may be made, the underlying information must be communicated to a location which can make decisions to generate the flow control messages. These flow control messages then need to be sent to the locations that react to the flow control decisions. For example, traffic between a source and destination may be routed across multiple paths through a packet switching system, and traffic going to a particular destination may be sent from multiple sources. Also, in typical packet switching systems, packets may be queued at various locations such as in various stages of a switching fabric. Thus, the flow control information concerning the traffic going to a destination or even between a source destination pair may be distributed throughout the packet switching system, and typically is not native at the location or to the process which makes the flow control signaling decisions. One mechanism for distributing control information is to broadcast the information in reaction to the detection of a predefined condition. This approach typically generates a large peak of messages at a time when the switching system is possibly already suffering from a lack of bandwidth in one or more locations within itself. Another possible mechanism for communicating the flow control information to the requisite flow control decision points and for communicating the decisions to the reaction points is for each element having flow control information to autonomously and periodically broadcast such information. However, this autonomous approach can lead to congestion and delays. Desired are improved methods and systems for distributing flow control and other information in a packet switching system.

SUMMARY OF THE INVENTION

Systems and methods are disclosed for sending multiple ordered sets of data. One embodiment receives a barrier phase transition, and in response, resets a current data set indicator for the multiple ordered sets of data to a predetermined ordered set. An ordered set of data of the plurality of ordered sets of data indicated by the current data set indicator is sent, and the current data set indicator is advanced to a next ordered set of data of the multiple ordered sets of data.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
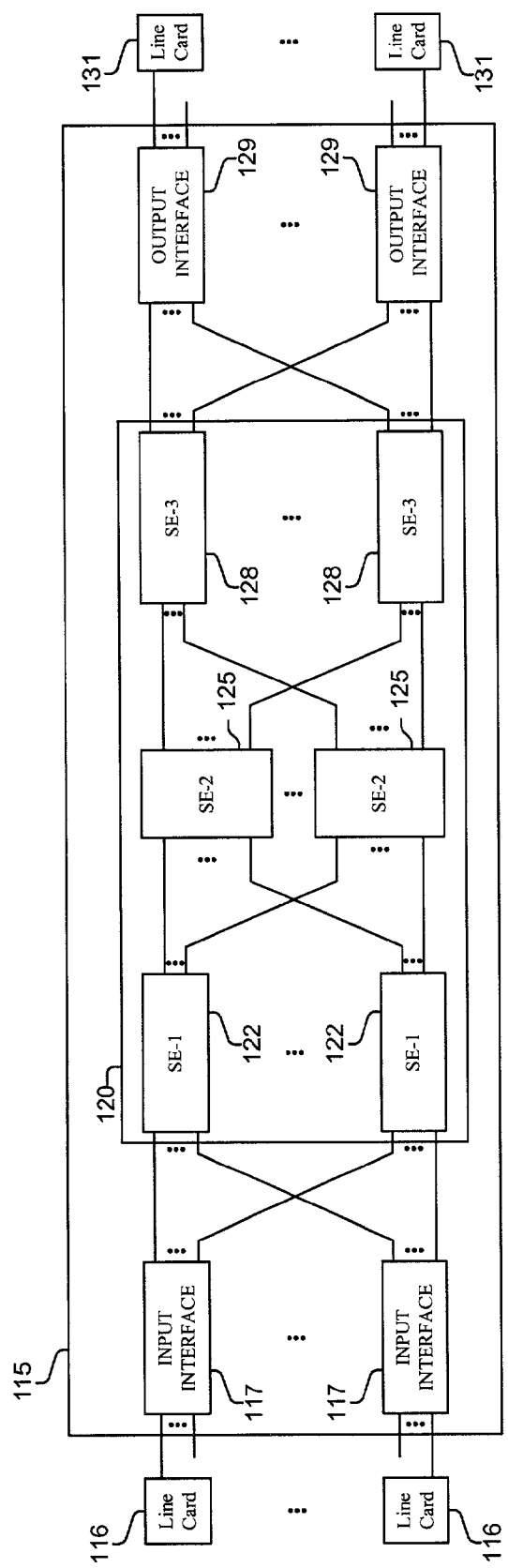
FIGS. 1A–C are block diagrams of exemplary packet switching system embodiments using barrier synchronization.

Methods and apparatus are disclosed for using barrier phases to synchronize processes and components in a packet switching system, including, for example, but not limited to the use of barrier phases in the coordinated timing of the sending of information within a packet switching system, and the use of barrier phases in a packet sequence number windowing protocol. The use of barrier phases may be used in most any device or system for example, inter alia, in a computer or communications system, such as a packet switching system, router, or other device.

The methods and apparatus disclosed herein are not limited to a single computer or communications system. Rather, the architecture and functionality taught herein are extensible to an unlimited number of computer and communications systems, devices and embodiments in keeping with the scope and spirit of the invention. Embodiments described herein include various elements and limitations, with no one element or limitation contemplated as being a critical element or limitation. Each of the claims individually recite an aspect of the invention in its entirety. Moreover, some embodiments described may include, but are not limited to, inter alia, systems, integrated circuit chips, embedded processors, ASICs, methods, and computer-readable medium containing instructions. The embodiments described hereinafter embody various aspects and configurations within the scope and spirit of the invention.

As used herein, the term "packet" refers to packets of all types, including, but not limited to, fixed length cells and variable length packets, each of which may or may not be divisible into smaller packets or cells. Moreover, these packets may contain one or more types of information, including, but not limited to, voice, data, video, and audio information. Furthermore, the term "system" is used generically herein to describe any number of components, elements, sub-systems, devices, packet switch elements, packet switches, networks, computer and/or communication devices or mechanisms, or combinations of components thereof. The term "computer" is used generically herein to describe any number of computers, including, but not limited to personal computers, embedded processors, ASICs, chips, workstations, mainframes, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The terms "first," "second," etc. are typically used herein to denote different units (e.g., a first element, a second element). The use of these terms herein does not necessarily connote an ordering such as one unit or event occurring or coming before the another, but rather provides a mechanism to distinguish between particular units.

Methods and apparatus are disclosed for using barrier phases to synchronize processes and components in a packet switching system, including, for example, but not limited to the use of barrier phases in the coordinated timing of the sending of information within a packet switching system, and the use of barrier phases in a packet sequence number windowing protocol. In one embodiment, elements are assigned to one of multiple ordered sets of a barrier groups, wherein each element of a barrier group must be set to a common barrier state before any element of a next a barrier group can switch to a next barrier state, and once all elements of a particular barrier group switch to a new barrier state, all the elements of the next barrier group begin to switch to the next barrier state. In this manner, the switching between barrier phases provides a synchronization mechanism between all the elements belonging to a particular barrier group, and a synchronization mechanism between barrier groups.

In one embodiment including a packet switching fabric, elements may be assigned to a common barrier group based on their functionality. For example, first stage switching elements are in one barrier group, second stage switching elements are in a different barrier group, third stage switching elements are in yet a different barrier group, etc. In this exemplary embodiment, each element of a particular switching stage is synchronized by its barrier transitions with all the other elements of the particular switching stage.

Some embodiments use one sets of barrier states, while other embodiments use more than one sets of barrier states. The number of barrier sets for a device is typically determined based on its characteristics, configuration, traffic patterns, and/or other criteria. For example, a packet switching system might use a barrier phase to synchronize several operations, use an independent barrier phase for a certain operation or operations, use a separate barrier phase for each priority and/or quality of service of traffic, and/or any variations of these and other possibilities. For ease of understanding for the reader, certain descriptions herein will describe the actions of a single set of barrier states, while it is to be understood that one or more other sets of barrier transitions may be simultaneously and/or sequentially occurring.

In one embodiment, the source, destination, and switching nodes are systematically switched among two or more barrier phases (e.g., operational states). In one embodiment, the switching between phases is performed continuously in response to the flow of barrier request and barrier acknowledgement packets or signals. In one embodiment, barrier requests are used without barrier acknowledgements. In one embodiment, the rate of switching between barrier phases is limited or additionally determined in response to a certain number of packets being sent or after a predetermined period of time.

To switch between barrier phases in one embodiment, each source node broadcasts to all forward connected switching nodes a barrier request to change to a next barrier state. After a switching node has received such a barrier request on all incoming links for a particular barrier set, the switching node switches barrier states and propagates the barrier request for the particular barrier set. If there are packets in any outgoing queues, the barrier request is typically placed in the queues after these queued packets to ensure that the barrier request is sent to a next stage in this order. In one embodiment, another technique is used to ensure that all packets of the previous barrier phase have been forwarded before the barrier request for the next barrier phase is forwarded. These various techniques include using counters to count occupancy per barrier phase in each queue or within the particular node, and using per barrier phase queues and preferentially draining packets belonging to the previous barrier phase.

Upon receiving barrier requests over all links for a particular barrier set, each destination node relays an acknowledgement message to all connected source nodes, which then send a barrier acknowledgement in much the same way (except barrier acknowledgement messages are typically sent immediately out rather than being placed in a queue), and each source node changes its barrier state for the particular barrier set causing sent packets belonging to the barrier set to indicate the new barrier state.

Methods and apparatus are disclosed for using barrier phases to synchronize the transmission of information from distributed components. For example, the transition of barrier phases may be used to reset or realign the sending of information by these distributed components. Typically in packet switching systems, flow control information needs to be communicated to one or more other elements which can then make flow control and/or other decisions and generate appropriate control signals or packets. In one embodiment, a packet switching fabric collects flow control and/or other information (e.g., packet counts, buffer occupancies, etc.) in certain distributed switching elements, with the distributed elements of a common barrier group maintain pseudo duplicate flow control data structures. Each of these distributed elements is programmed with a different predetermined offset for cycling through and sending segments of the data structure in a predetermined order, such that typically each element concurrently sends a different portion of the information. Using barrier phase transitions to synchronize the sending of the information by these distributed components, the latency of communicating the entire data structure can be reduced with typically less congestion than if each element sent the information autonomously.

In one embodiment, a component (e.g., a switching or other element) maintains a data structure indicating known flow control information, with this flow control information being distributed to downstream components in coordination with the timing of the switching between barrier phases. In one embodiment, each downstream component accumulates received flow control information in a data structure, and periodically forwards its accumulated flow control information to its downstream elements and other components. In response to the changing barrier phases, the sending of the information is typically reset to a predetermined point (e.g., an address or location) in the data structure. In this manner, the sender and receiver may become synchronized in regards to the sent information, which may reduce or eliminate other identification data (e.g., an address, location, etc.) describing the information being sent that must be communicated between the sender and receivers of the information. In one embodiment, less than all components accumulate and maintain a data structure indicating received flow control information; rather certain components forward without accumulating the received information to one or more downstream components.

Methods and apparatus are also disclosed for using barrier phases to limit the disorder of packets in a packet switching system. By limiting the number of packets sent per barrier phases, the range and size of the sequence number space and the size of outgoing, resequencing, and reassembling buffers may be bounded to a smaller quantity. Additionally, this approach further provides a packet time-out mechanism to identify lost or delayed packets, which may be especially useful when non-continuous sequence numbers or time-stamps are included in packets for resequencing and/or reassembly purposes, or when a packet switching system drops a packet.

In one embodiment of a packet switching system, source nodes, which distribute packets to various switching planes or elements, include an indication of their current barrier state in sent packets. For each barrier state, a predetermined range of sequence numbers may be included in packets to identify their ordering, which limits the number of packets sent by a source node for each barrier phases. In another embodiment, a counting space is used to limit the maximum number of packets sent for each barrier state.

Upon exhaustion of a particular range of sequence numbers or counting space, a source node stops sending packets until the source node transitions to the next barrier phase when the range of sequence numbers or counting space is reset and reused. For example, in one embodiment, upon a barrier transition (e.g., after receiving the barrier acknowledgement messages or barrier requests over all links for the particular barrier set), each destination stage switches its barrier state for the particular barrier set, and then the destination can manipulate (e.g., resequence, reassemble, send, place in an output queue, etc.) packets marked with the previous barrier state as it knows that every packet from the previous barrier state has been received for the particular barrier set.

FIGS. 1A–3C and their discussion herein are intended to provide a description of a few of the numerous variety of embodiments which use a barrier scheme to synchronize processes and components in the packet switching system, including, for example, but not limited to the use of barrier phases in the coordinated timing of the sending of information within a packet switching system, and the use of barrier phases in a packet sequence number windowing protocol. A particular embodiment may use a barrier scheme in one or more locations within itself, and does not necessarily implement such a barrier scheme in all possible locations, including all the possible locations described herein in relation to the figures.

Figure 1B:
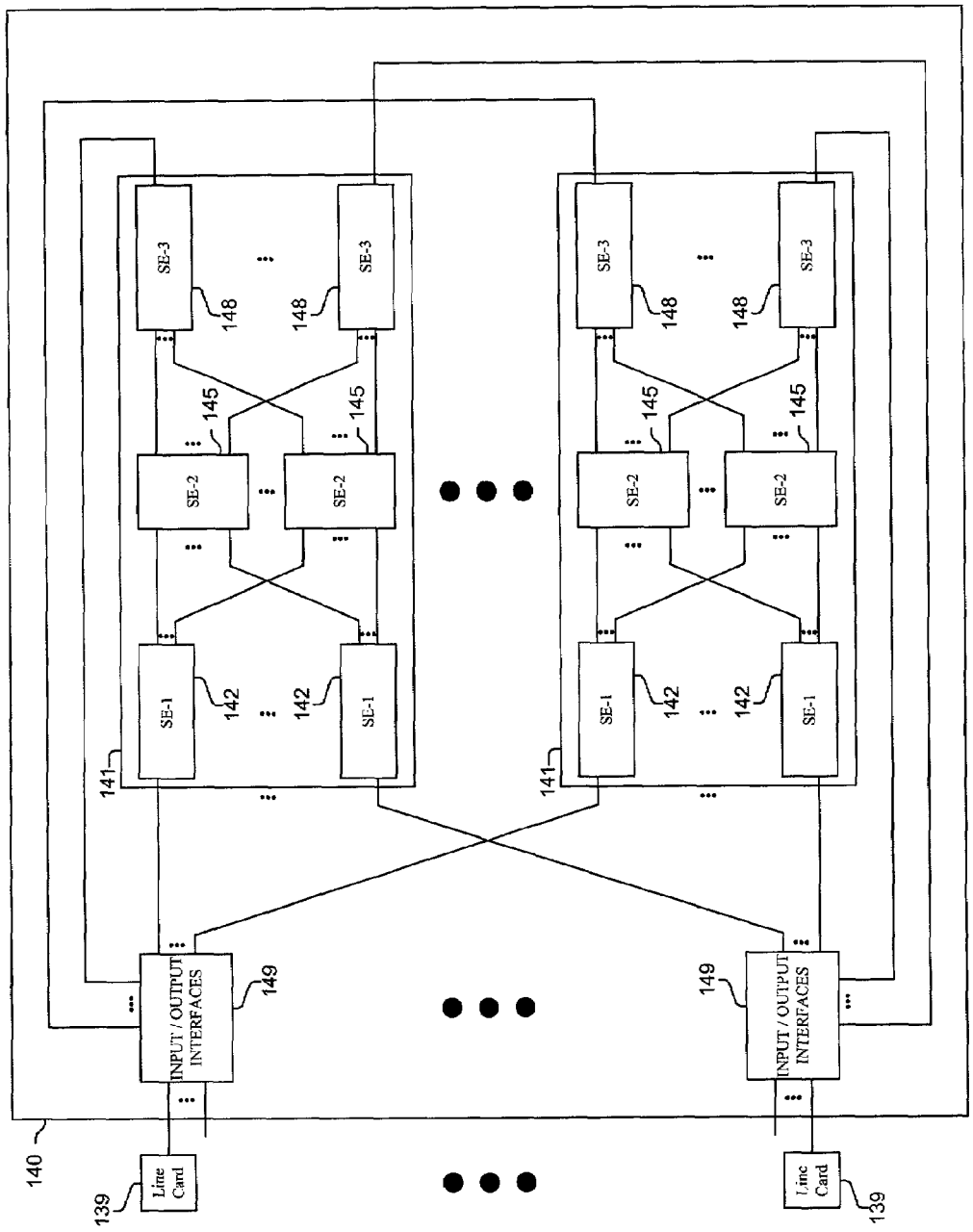
Figure 1C:
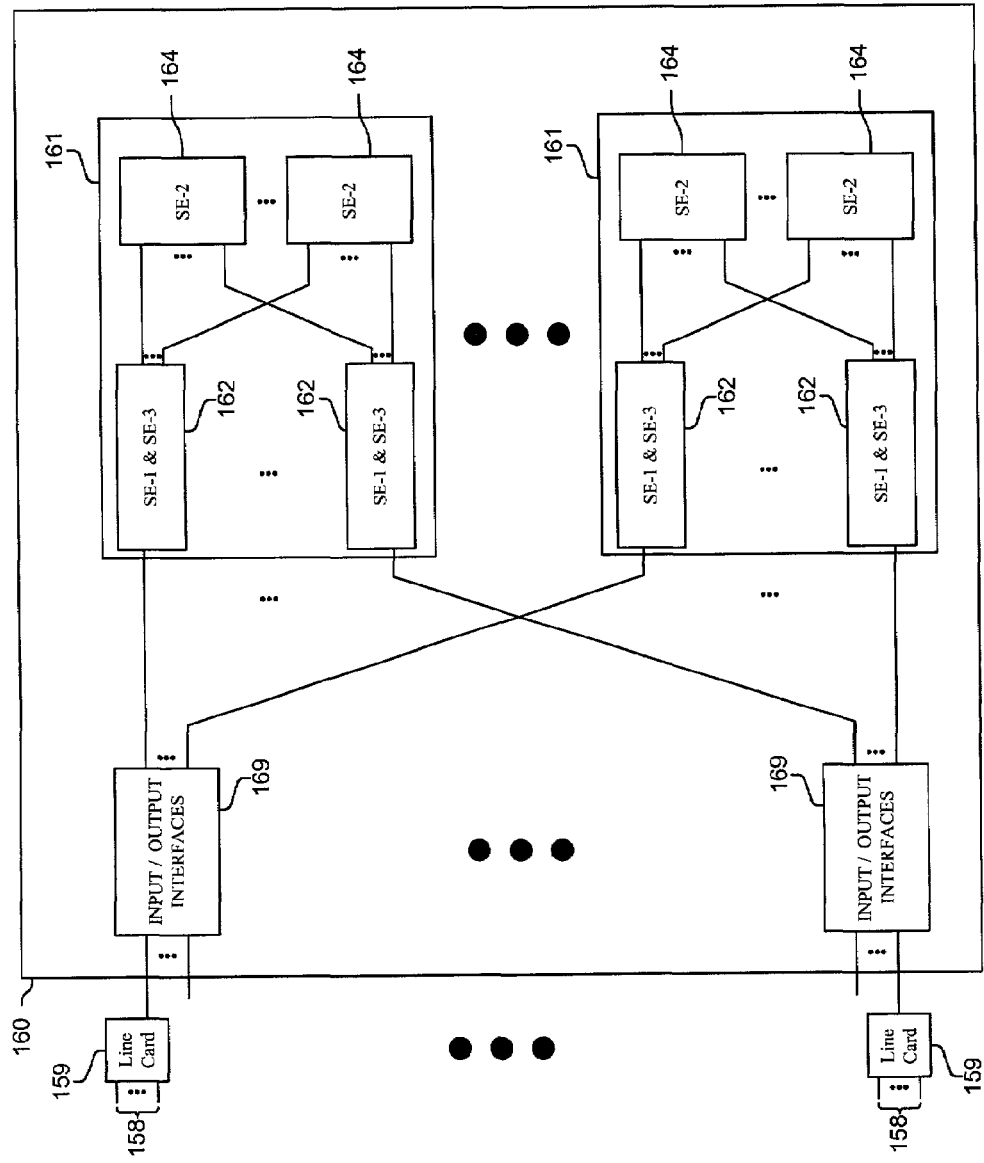

FIGS. 1A–C illustrate a few of many embodiments including different packet switching systems and topologies thereof. FIG. 1A illustrates an exemplary packet switch 115 having multiple inputs and outputs and a single interconnection network 120. FIG. 1B illustrates an exemplary packet switch 140 having multiple interconnection networks 141 and folded input and output interfaces 149. FIG. 1C illustrates an exemplary folded packet switch 160 having multiple interconnection networks 161 and folded input and output interfaces 169. Embodiments of each of these packet switches 115, 140 and 160 and line cards to which they are connected use a barrier scheme system as disclosed herein. Of course, the invention is not limited to these illustrated operating environments and packet switching systems, and the packet switching systems may have more or less elements.

FIG. 1A illustrates an exemplary embodiment of a packet switch 115. Packet switch 115 comprises multiple input interfaces 117, interconnection network 120, and output interfaces 129. Input interfaces 117 and output interfaces 129 are both coupled over multiple links to interconnection network 120. Line cards 116 and 131 are coupled to input interfaces 117 and output interfaces 129. In some embodiments including other packet switching topologies, line cards or their functionality may be included in the packet switch itself, or as part of the packet switching system.

In one embodiment, interconnection network 120 comprises multiple switch elements SE-1 122, SE-2 125, and SE-3 128 that are interconnected by multiple links. Line cards 116 and 131 may connect to other systems (not shown) to provide data items (e.g., packets) to be routed by packet switch 115. Embodiments use a barrier scheme according to the invention in one or more components, including line cards 116, 131, input interfaces 117, switch elements SE-1 122, SE-2 125, and SE-3 128, output interfaces 129, and/or other locations within packet switch 115 or the packet switching system.

FIG. 1B illustrates another exemplary operating environment and embodiment of a packet switch 140. Packet switch 140 comprises multiple folded input and output interfaces 149 interconnected over multiple links to interconnection networks 141, which are interconnected over multiple links returning to input and output interfaces 149. In one embodiment, interconnection networks 141 comprise multiple switch elements SE-1 142, SE-2 145, and SE-3 148 also interconnected by multiple links. Interfaces 149 may connect via bi-directional links to line cards 139 that connect with other systems (not shown) to provide data items (e.g., packets) to be routed by packet switch 140. Embodiments use a barrier scheme according to the invention in one or more components, including line cards 139, input and output interfaces 149, switch elements SE-1 142, SE-2 145, and SE-3 148, and/or other locations within packet switch 140 or the packet switching system.

FIG. 1C illustrates another exemplary operating environment and embodiment of a packet switch 160. Packet switch 160 has a folded network topology. Packet switch 160 comprises multiple folded input and output interfaces 169 interconnected over multiple links to interconnection networks 161, which are interconnected over multiple links returning to interfaces 169. In one embodiment, interconnection networks 161 comprise multiple switch elements SE-1 & SE-3 162 and SE-2 164 also interconnected by multiple links. Interfaces 169 may connect via bi-directional links to line cards 159 which connect via ports 158 to other systems (not shown) to provide data items to be routed by packet switch 160. Embodiments use a barrier scheme according to the invention in one or more components, including line cards 159, input and output interfaces 169, switch elements SE-1 & SE-3 162 and SE-2 164, and/or other locations within packet switch 160 or the packet switching system.

Figure 2A:
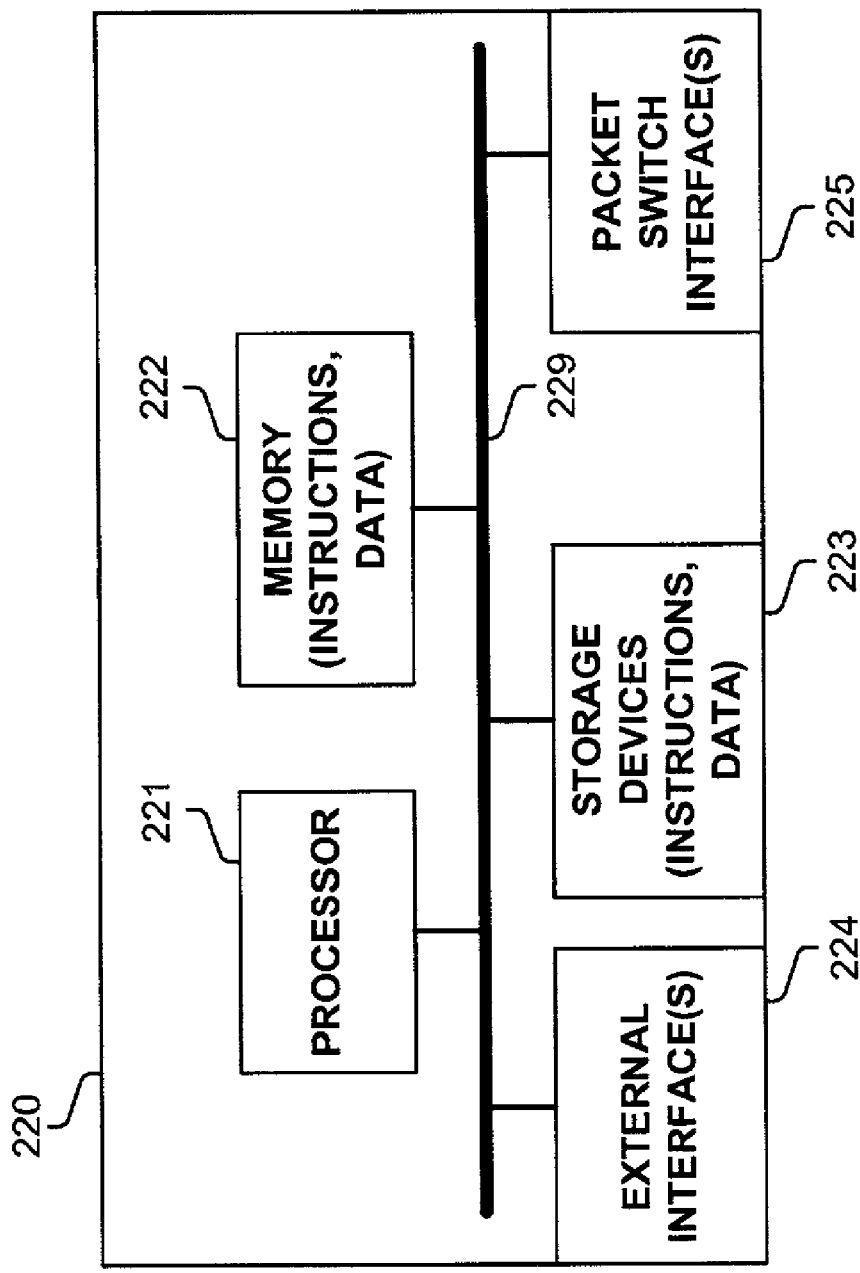
FIGS. 2A–C are block diagrams illustrating exemplary embodiments including a packet switching system component, such as, for example, a line card and/or input/output interface using barrier synchronization.
Figure 2B:
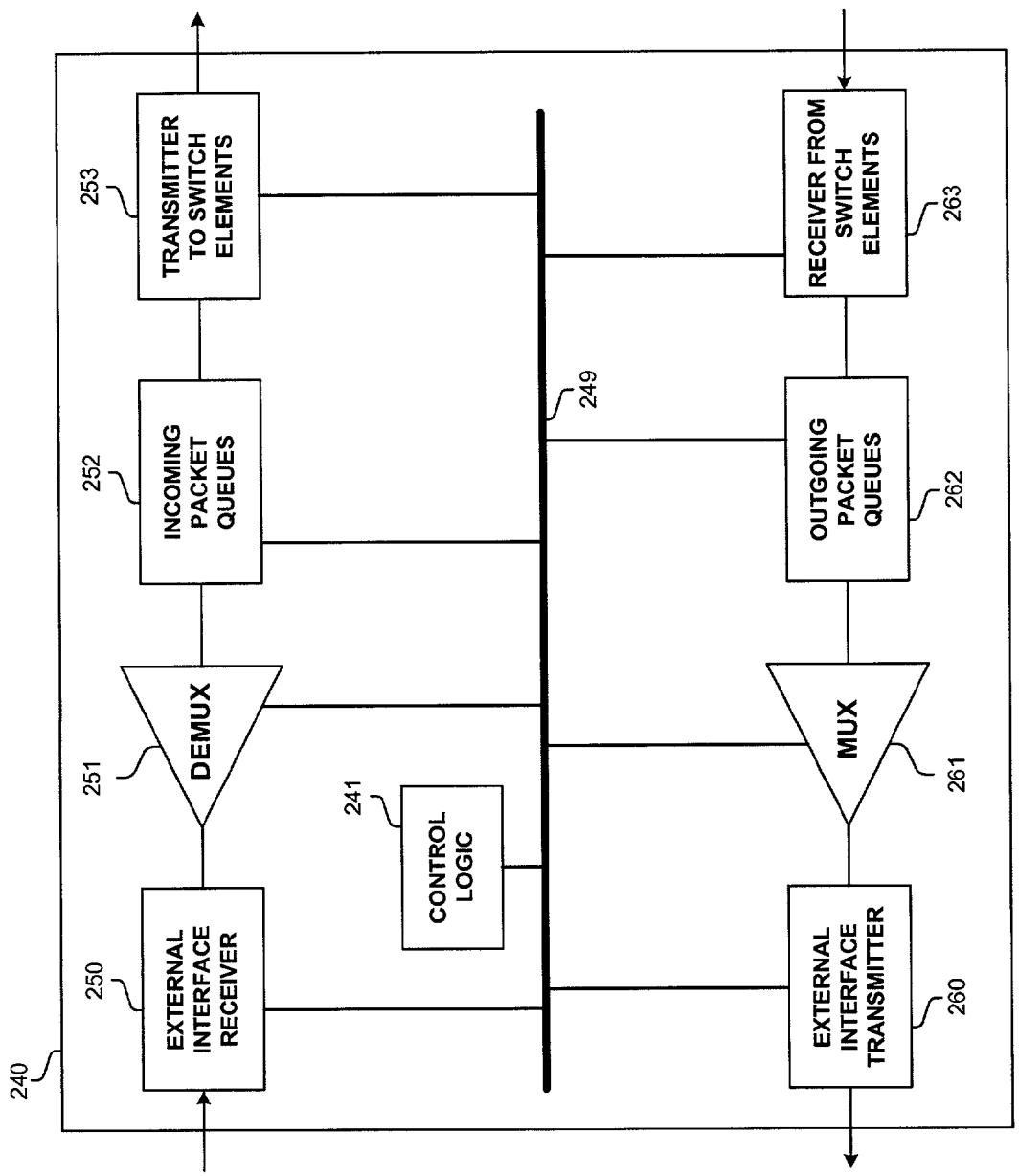
Figure 2C:
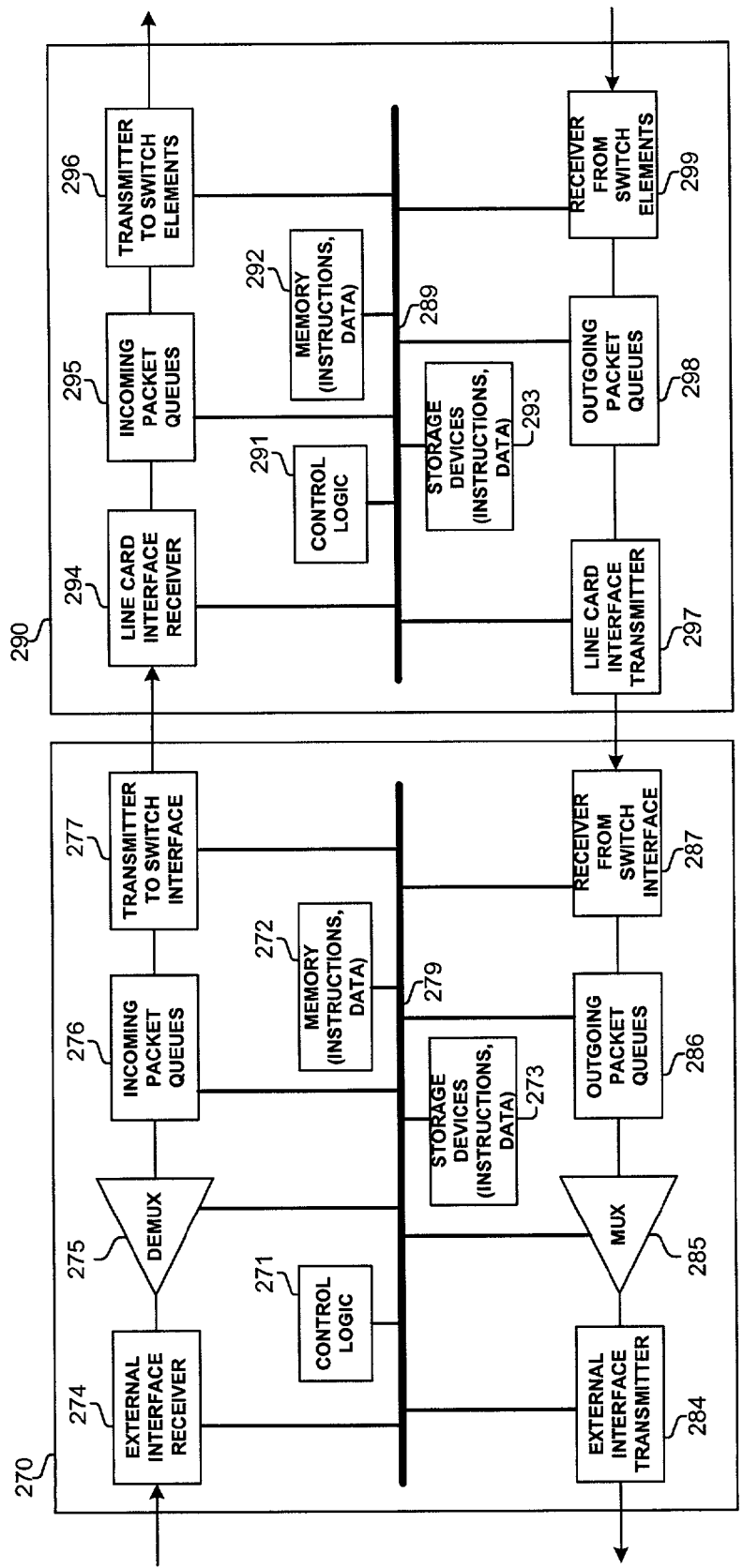

FIGS. 2A–C illustrate three of numerous possible embodiments of a line card, input interface, output interface, and/or input/output interface, which use a barrier scheme according to the invention. For illustrative purposes, only single transmitters and receivers may be shown. It should be clear to one skilled in the art that multiple transmitters and receivers may be used to communicate with multiple sources and destinations (e.g., line cards, switch fabrics, etc.)

FIG. 2A illustrates one embodiment 220 comprising a processor 221, memory 222, storage devices 223, and one or more external interface(s) 224, and one or more packet switch interface(s) 225, and one or more internal communications mechanisms 229 (shown as a bus for illustrative purposes). External interface(s) 224 receive and send external signals to one or more communications devices or networks (e.g., one or more networks, including, but not limited to the Internet, intranets, private or public telephone, cellular, wireless, satellite, cable, local area, metropolitan area and/or wide area networks). Memory 222 is one type of computer-readable medium, and typically comprises random access memory (RAM), read only memory (ROM), integrated circuits, and/or other memory components. Memory 222 typically stores computer-executable instructions to be executed by processor 221 and/or data which is manipulated by processor 221 for implementing a barrier scheme in accordance with certain embodiments of the invention. Storage devices 223 are another type of computer-readable medium, and typically comprise disk drives, diskettes, networked services, tape drives, and other storage devices. Storage devices 223 typically store computer-executable instructions to be executed by processor 221 and/or data which is manipulated by processor 221 for implementing a barrier scheme in accordance with certain embodiments of the invention.

As used herein, computer-readable medium is not limited to memory and storage devices; rather computer-readable medium is an extensible term including other storage and signaling mechanisms including interfaces and devices such as network interface cards and buffers therein, as well as any communications devices and signals received and transmitted, and other current and evolving technologies that a computerized system can interpret, receive, and/or transmit.

FIG. 2B illustrates embodiment 240 having a single element providing the functionality of a line card and an input/output interface, for example that of line card 159 and input/output interface 169 (FIG. 1C). FIGS. 2B–C will be described in relation to FIG. 1C for illustrative purposes; however, these embodiments could be used with other packet switch topologies and other implementations and embodiments. Embodiment 240 comprises control logic 241 implementing a barrier scheme in accordance with certain embodiments of the invention. In one embodiment control logic 241 includes memory for storage of data and instructions. Control logic 241 is connected to other components of embodiment 240 via one or more internal communications mechanisms 249 (shown as a bus for illustrative purposes). External interface receiver 250 receives external signals, separates the signals into channels using demultiplexor 251 into multiple streams of packets which are temporarily stored in incoming packet buffer 252. In one embodiment, at the appropriate time and in accordance with a barrier scheme disclosed herein, a packet is sent to the appropriate switch element SE-1 & SE-3 162 via transmitter to switch elements 253. Packets are received from switch elements SE-1 & SE-3 162 at the receiver from switch elements 263 and placed in the outgoing packet buffer 262. Multiplexer 261 extracts the packets and creates a multiplexed signal which is transmitted via external interface transmitter 260.

FIG. 2C illustrates an embodiment of a line card 270 and a switch interface 290, which could correspond to line card 159 and input/output interfaces 169 illustrated in FIG. 2C. The embodiment of line card 270 illustrated in FIG. 2C includes control logic 271 implementing a barrier scheme in accordance with certain embodiments of the invention. Control logic 271 is connected to other components of line card 270 via one or more internal communications mechanisms 279 (shown as a bus for illustrative purposes). In one embodiment, control logic 271 includes memory for storing instructions and data. Line card 270 also includes optional additional memory 272 and storage devices 273. External interface receiver 274 receives external signals 201 (FIG. 2), separates the signals into channels using demultiplexor 275 into multiple streams of packets which are temporarily stored in incoming packet buffer 276. At the appropriate time, a packet is sent to switch interface 290 via transmitter to switch interface 277. Packets are received from switch interface 290 at the receiver from switch interface 287 and placed in the outgoing packet buffer 286. Multiplexer 285 extracts the packets and creates a multiplexed signal which is transmitted via external interface transmitter 284. In one embodiment, control logic 271, referencing a data structure within control logic 271 or memory 272, to implement a barrier scheme.

The embodiment of input/output interface 290 illustrated in FIG. 2C includes control logic 291 implementing a barrier scheme in accordance with certain embodiments of the invention. Control logic 291 is connected to other components of switch interface 290 via one or more internal communications mechanisms 289 (shown as a bus for illustrative purposes). In one embodiment, control logic 291 includes memory for storing instructions and data. Switch interface 290 also includes optional additional memory 292 and storage devices 293. Line card receiver 294 receives packets from line card 270 temporarily stores the packets in incoming packet buffer 295. At the appropriate time, a packet is sent to an appropriate switch element SE-1 & SE-3 162 via transmitter to switch elements 296. Packets are received from switch elements SE-1 & SE-3 162 at the receiver from switch elements 299 and placed in the outgoing packet buffer 298. Line card interface transmitter 297 then forwards these to line card 270. In one embodiment, control logic 291, referencing a data structure within control logic 291 or memory 292, to implement a barrier scheme.

Figure 3A:
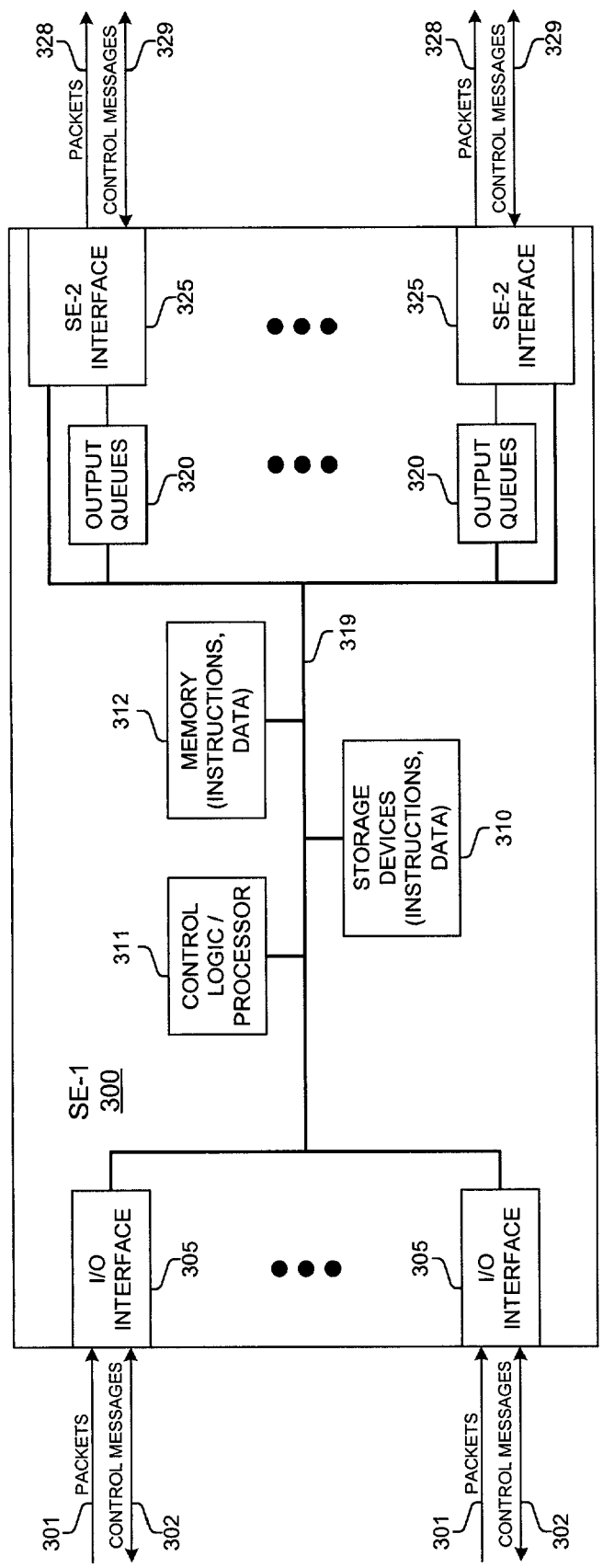
FIGS. 3A–C are block diagrams of exemplary embodiments including switching fabric components which may be synchronized using barrier phases.
Figure 3B:
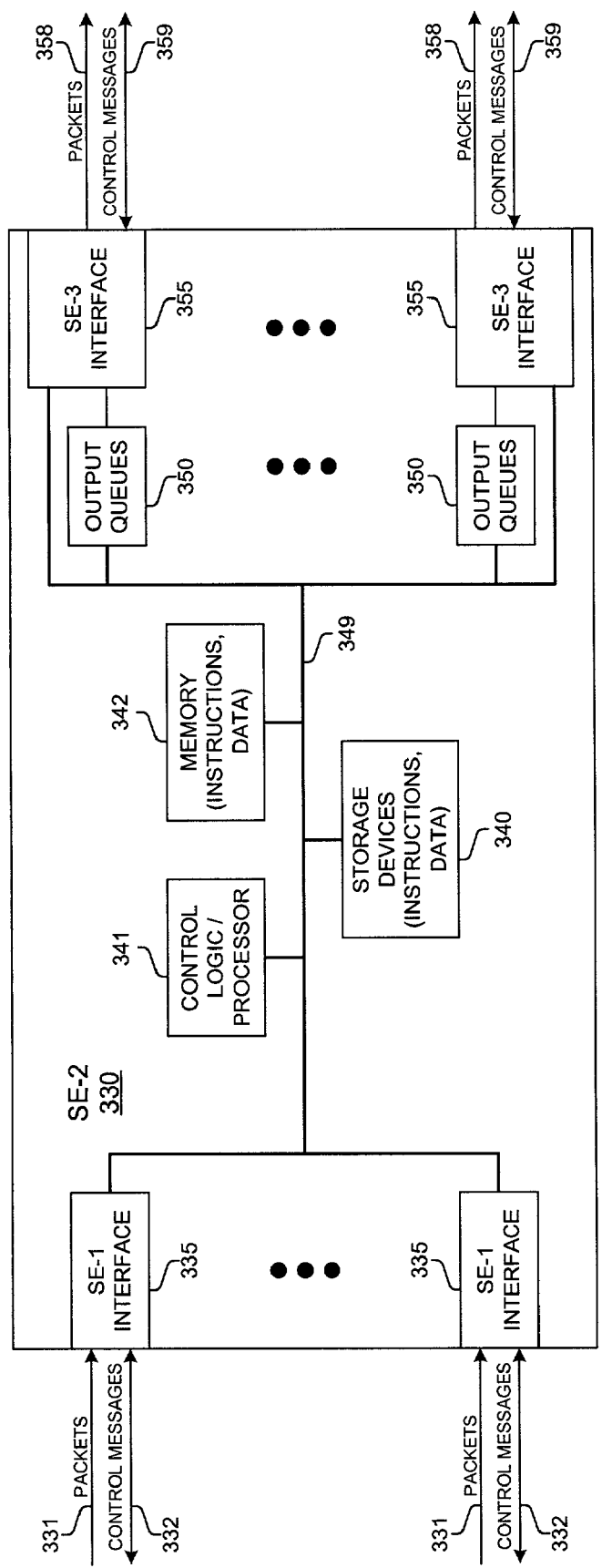
Figure 3C:
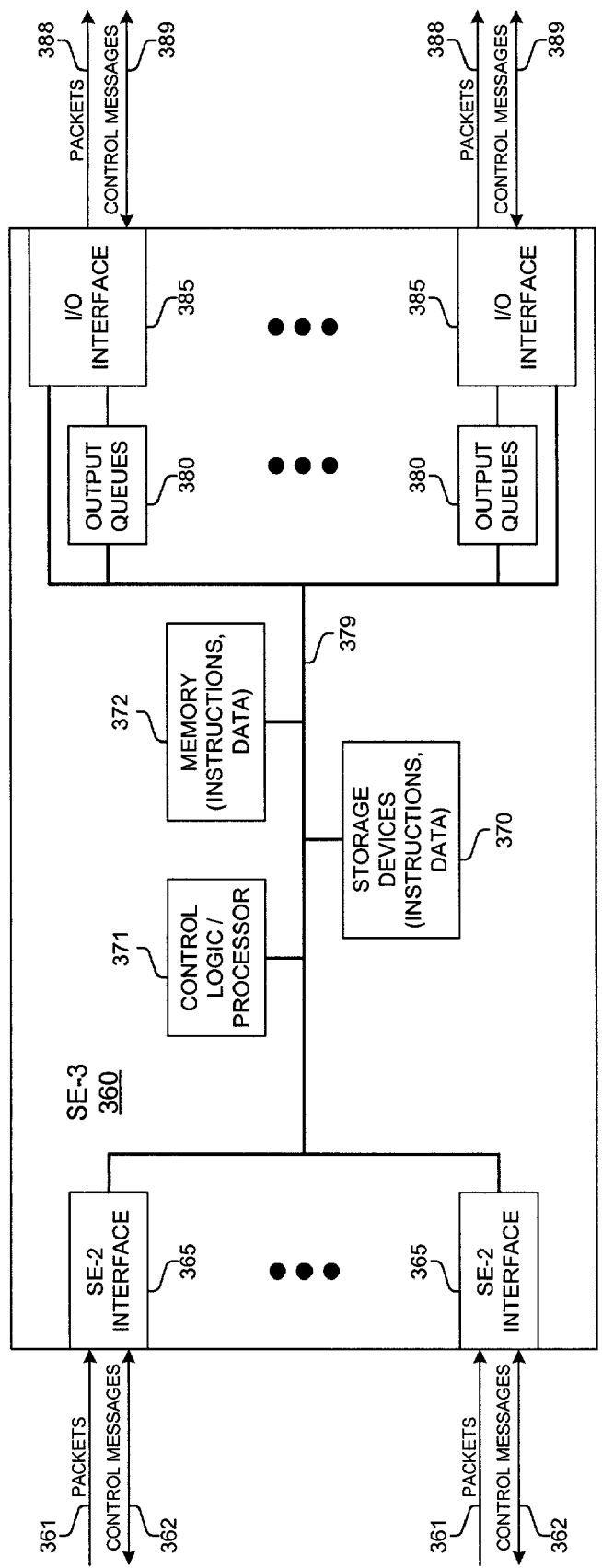

FIGS. 3A–C illustrate exemplary embodiments including switching elements and/or their components in accordance with certain embodiments of the invention for using barrier phases to synchronize processes and components, including, for example, but not limited to the use of barrier phases in the coordinated timing of the sending of information, and the use of barrier phases in a packet sequence number windowing protocol. FIG. 3A is a block diagram of a first stage switching element, SE-1 300. FIG. 3B is a block diagram of a second stage switching element SE-2 330. FIG. 3C is a block diagram of a third stage switching element SE-3 360. As would be understood by one skilled in the art, the invention is not limited to these or any other embodiment described herein. Rather, the invention as described herein is extensible to an unlimited number of embodiments and implementations.

FIG. 3A illustrates an embodiment of SE-1 300 comprising control logic and/or processor 311 (hereinafter "control logic"), memory 312, storage devices 310, I/O interfaces 305, output queues 320, SE-2 interfaces 325, and one or more internal communications mechanisms 319 (shown as a bus for illustrative purposes). In certain embodiments, control logic 311 comprises custom control circuitry for controlling the operation of SE-1 300 and no storage device 310 is used. Memory 312 is one type of computer-readable medium, and typically comprises random access memory (RAM), read only memory (ROM), integrated circuits, and/or other memory components. Memory 312 typically stores computer-executable instructions to be executed by control logic 311 and/or data which is manipulated by control logic 311 for implementing a barrier scheme in accordance with certain embodiments of the invention. Storage devices 310 are another type of computer-readable medium, and typically comprise disk drives, diskettes, networked services, tape drives, and other storage devices. Storage devices 310 typically store computer-executable instructions to be executed by control logic 311 and/or data which is manipulated by control logic 311 for implementing a barrier scheme in accordance with certain embodiments of the invention.

Each SE-1 300 receives packets 301 and exchanges control messages 302 over one or more links with one or more input interfaces (not shown) such as input/output interface 290 (FIG. 2C) via I/O interfaces 305. In other embodiments, data packets and control messages are transmitted over a common link or links, and/or communication interfaces have a folded topology. Additionally, each SE-1 300 sends packets 328 and exchanges control messages 329 over one or more links with one or more SE-2 elements (not shown) such as SE-2 330 (FIG. 3B) via SE-2 interfaces 325. Control logic 311 may be used to implement a barrier scheme. Outgoing packets and control messages are placed in output queues 320. In one embodiment, there is an output queue 320 for each destination, or for each class of service for each destination. In one embodiment, each output queue 320 implements a barrier scheme according to the invention. In one embodiment, each input and/or output interface 305, 325 implements a barrier scheme according to the invention.

FIG. 3B illustrates an embodiment of SE-2 330 comprising control logic and/or processor 341 (hereinafter "control logic"), memory 342, storage devices 340, SE-1 interfaces 335, output queues 350, SE-3 interfaces 355, and one or more internal communications mechanisms 349 (shown as a bus for illustrative purposes). In certain embodiments, control logic 341 comprises custom control circuitry for controlling the operation of SE-2 330 and no storage device 340 is used. Memory 342 is one type of computer-readable medium, and typically comprises random access memory (RAM), read only memory (ROM), integrated circuits, and/or other memory components. Memory 342 typically stores computer-executable instructions to be executed by control logic 341 and/or data which is manipulated by control logic 341 for implementing a barrier scheme in accordance with certain embodiments of the invention. Storage devices 340 are another type of computer-readable medium, and typically comprise disk drives, diskettes, networked services, tape drives, and other storage devices. Storage devices 340 typically store computer-executable instructions to be executed by control logic 341 and/or data which is manipulated by control logic 341 for implementing functionality in accordance with certain embodiments of the invention.

Each SE-2 330 receives packets 331 and exchanges control messages 332 over one or more links with one or more SE-1 elements (not shown) such as SE-1 300 (FIG. 3A) via SE-1 interfaces 335. In other embodiments, data packets and control messages are transmitted over a common link or links, and/or communication interfaces have a folded topology. For example, the communications functions of SE-1 interface 335 and SE-3 interface 355 could be combined, which is particularly useful in an embodiment where SE-1 300 (FIG. 3A) and SE-3 360 (FIG. 3C) are implemented on a single component. (e.g., chip or circuit board). Additionally, each SE-2 330 sends packets 358 and exchanges control messages 359 over one or more links with one or more SE-3 elements (not shown) such as SE-3 360 (FIG. 3C) via SE-3 interfaces 355. In one embodiment using a folded topology, the links between (a) SE-2 330 and SE-1 300 and (b) SE-2 330 and SE-3 360 are the same links. Control logic 341 may implement a barrier scheme. Outgoing packets and control messages are placed in output queues 350. In one embodiment, there is an output queue 350 for each destination, or for each class of service for each destination. In one embodiment, each output queue 350 implements a barrier scheme according to the invention. In one embodiment, each input and/or output interface 335, 355 implements a barrier scheme according to the invention.

FIG. 3C illustrates an embodiment of SE-3 360 comprising control logic and/or processor 371 (hereinafter "control logic"), memory 372, storage devices 370, SE-2 interfaces 365, output queues 380, I/O interfaces 385, and one or more internal communications mechanisms 379 (shown as a bus for illustrative purposes). In certain embodiments, control logic 371 comprises custom control circuitry for controlling the operation of SE-3 360 and no storage device 370 is used. Memory 372 is one type of computer-readable medium, and typically comprises random access memory (RAM), read only memory (ROM), integrated circuits, and/or other memory components. Memory 372 typically stores computer-executable instructions to be executed by control logic 371 and/or data which is manipulated by control logic 371 for implementing functionality in accordance with certain embodiments of the invention. Storage devices 370 are another type of computer-readable medium, and typically comprise disk drives, diskettes, networked services, tape drives, and other storage devices. Storage devices 370 typically store computer-executable instructions to be executed by control logic 371 and/or data which is manipulated by control logic 371 for implementing a barrier scheme in accordance with certain embodiments of the invention.

Each SE-3 360 receives packets 361 and exchanges control messages 362 over one or more links with one or more SE-2 elements (not shown) such as SE-2 330 (FIG. 3B) via SE-2 interfaces 365. In other embodiments, data packets and control messages are transmitted over a common link or links, and/or communication interfaces have a folded topology. Additionally, SE-3 360 sends packets 388 and exchanges control messages 389 over one or more links with one or more output interface elements (not shown) such as Input/Output interface 390 (FIG. 2C) via I/O interfaces 385. Control logic 371 receives control packets containing flow control information, and updates its flow control data structure stored in memory 372. In one embodiment, there is an output queue 380 for each destination, or for each class of service for each destination. In one embodiment, each output queue 380 implements a barrier scheme according to the invention. In one embodiment, each input and/or output interface 365, 385 implements a barrier scheme according to the invention.

The descriptions herein with reference to all the figures typically describe receiving barrier messages and transitions from multiple sources. Of course within a system, some sources or links may be currently unavailable, so the descriptions herein typically refer to the currently active links, planes, etc.

FIGS. 4A–E depicts one set of snapshots of an operation of changing a barrier phase in a packet switching fabric 400. The architecture of this illustrated switching fabric 400 is first described, which is then followed by a description of an embodiment of a barrier state transition. Of course, the embodiment of the barrier scheme described in regards to the particular switching fabric 400 and the order of sending of barrier requests and acknowledgements are not limiting. Rather, the invention is extensible and FIGS. 4A–E illustrate the operation at a particular moment of one embodiment. The teachings of the invention and this particular embodiment may be adapted for other switching implementations, architectures, and computer and communications systems.

FIGS. 4A–E illustrate a packet switching fabric having multiple I/O interfaces 410A–P. Note, the illustration of the topology of packet switching fabric 400 represents the same I/O interfaces 410A–P on both the left and right sides of the figures for simplicity of illustration and ease of understanding, rather than drawing links back to one representation of I/O interfaces 410A–P. Also, switch elements SE-1 411A–D and SE-3 413A–D are illustrated separately; however in certain embodiments such as that illustrated in FIG. 1C, some of these switching elements 411A–D and 413A–D may be implemented in the same component. Moreover, other embodiments employ a different packet switch topology, such as, but not limited to a non-folded network, which provides some mechanism to convey barrier requests and acknowledgements from the output or egress portion of the packet switch back to the input or ingress portion.

In general, the barrier state transition is initiated when each I/O interface 410A–P sends to their connected SE-1 elements 411A–D a barrier request to change to a next barrier state. After an SE-1 element 411A–D has received such a barrier request on all incoming links, the switching node propagates the barrier request to SE-2 elements 412A–D. If there are packets in any outgoing queues, the barrier request is placed in the queues after these queued packets, to ensure that the barrier request is sent to a next stage in this order. After an SE-2 element 412A–D has received such a barrier request on all incoming links, the switching node propagates the barrier request to SE-3 elements 413A–D. If there are packets in any outgoing queues, the barrier request is placed in the queues after these queued packets, to ensure that the barrier request is sent to a next stage in this order. After an SE-3 element 413A–D has received such a barrier request on all incoming links, the switching node propagates the barrier request to connected I/O interfaces 410A–P. If there are packets in any outgoing queues, the barrier request is placed in the queues after these queued packets, to ensure that the barrier request is sent to a next stage in this order.

In one embodiment, the current barrier state is changed upon receiving barrier requests on its ingress portion over all links, while in one embodiment, barrier acknowledgement phases and states are used and the current barrier state is not changed until receiving a barrier acknowledgement on its ingress portion over all links. In one embodiment using barrier acknowledgement phases and states, upon receiving barrier requests on its ingress portion over all links, each I/O interface 410A–P relays a barrier acknowledgement to its egress portion, which results each I/O interface 410A–P sending a barrier acknowledgement in much the same way as described supra, except barrier acknowledgements are typically sent immediately out rather than being placed in a queue, and each I/O interface 410A–P changes its barrier state on its egress portion causing sent packets to indicate the new barrier ack state. Upon receiving all the barrier acknowledgements over all links, each I/O interface 410A–P switches its barrier state on its ingress portion, and then an I/O interface 410A–P may fully manipulate (e.g., resequence, reassemble, send, place in an output queue, etc.) all packets marked with the previous barrier state as it knows that every packet from the previous barrier state has been received. Barrier requests and acknowledgements may be included in data and/or control packets, or relayed over signaling lines.

Figure 4A:
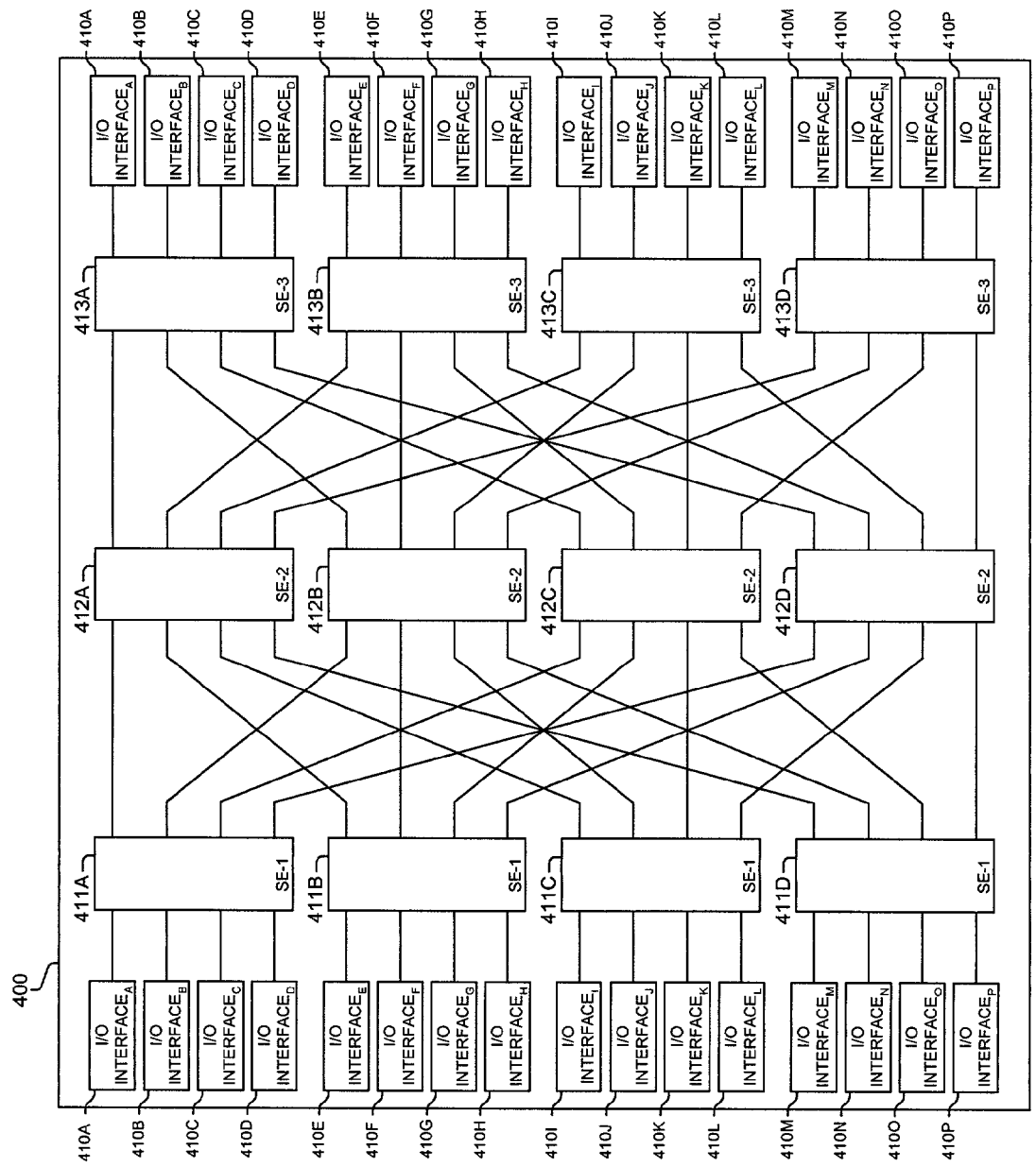
FIGS. 4A–E are block diagrams illustrating one embodiment of changing barrier phases within a switching fabric.
Figure 4B:
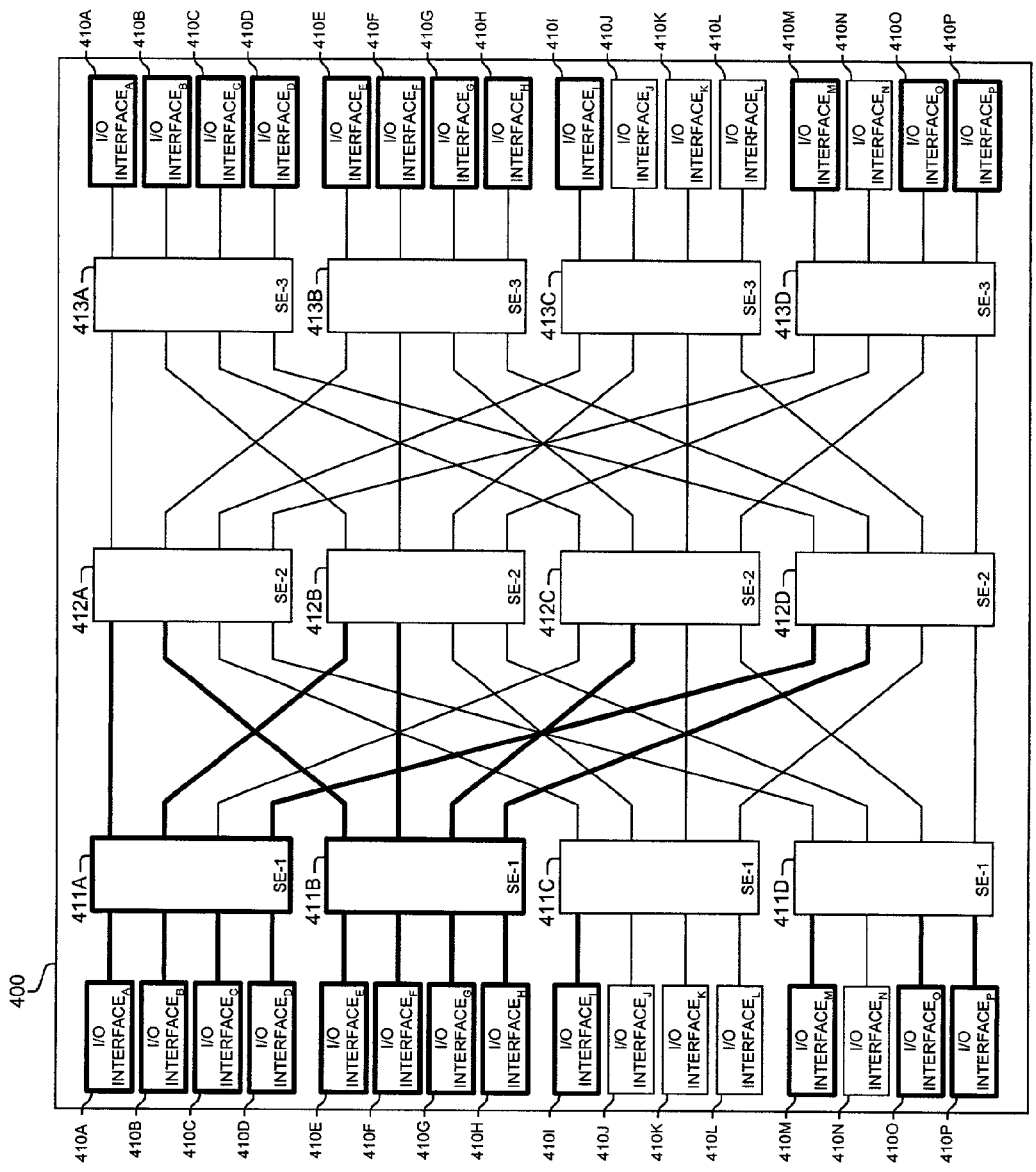
Figure 4C:
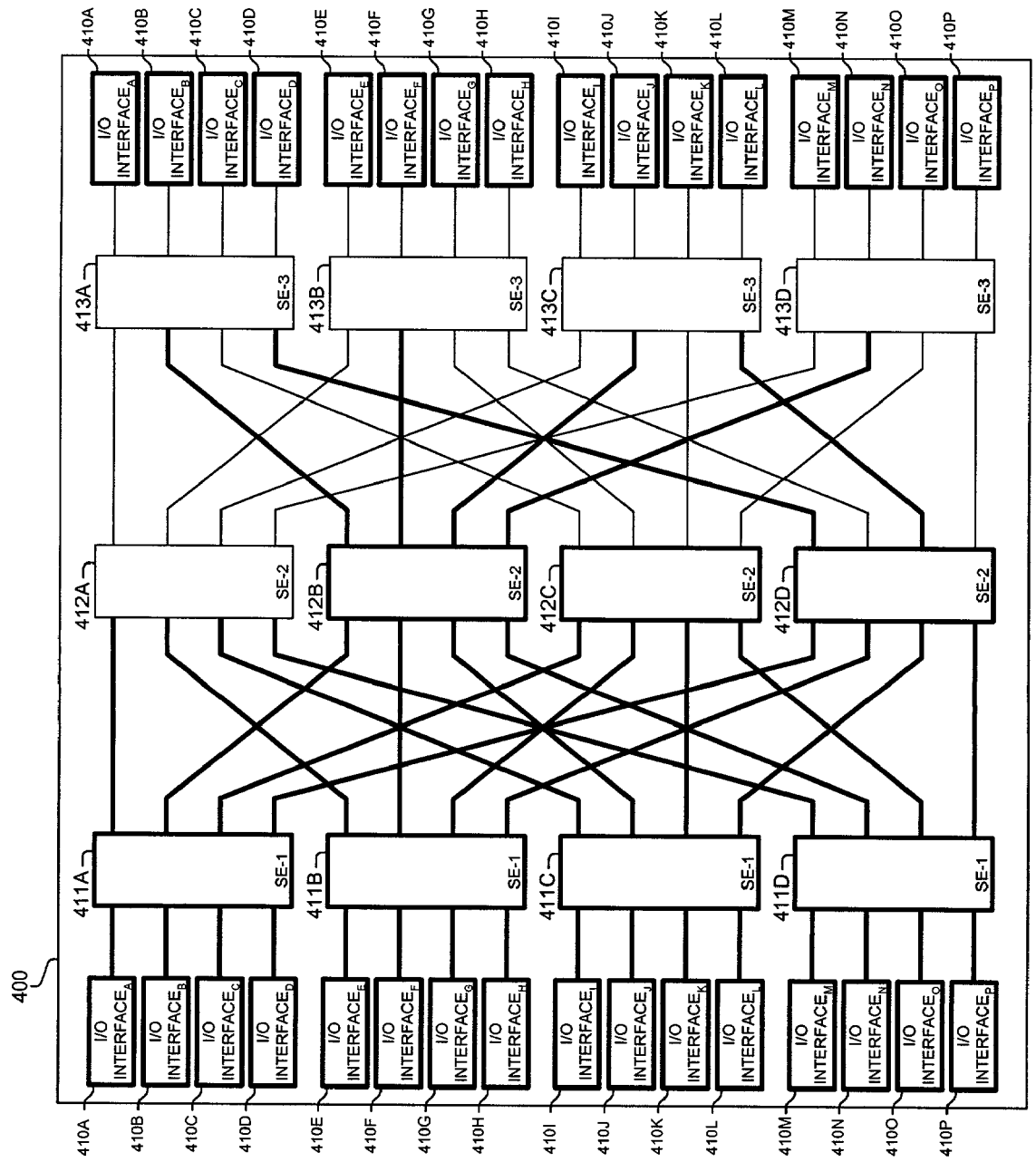

Turning now to one illustration, shown in FIG. 4A, are no highlighted elements indicating that all the packet switching fabric 400 are in the same barrier state. Next, in FIG. 4B, I/O interfaces 410A–410I, 410M, and 410O-P are highlighted to indicate that they are initiating a request for packet switching fabric 400 to migrate to a next barrier state. SE-1 411A–B are highlighted to indicate that they have received a barrier request over all their incoming links, and therefore, may propagate the barrier request to downstream nodes. Note, one output link of SE-1 411A is not highlighted to indicate that there might be a delay in relaying the barrier request. Such a delay may be due to a set of queued packets from the previous state which must proceed prior to the further propagation of the barrier request from SE-1 411A. Turning to FIG. 4C, more nodes 411C–D, 412B–D are highlighted to indicate that they have received the requisite or predetermined number of barrier requests over each of the links from the previous nodes. Note, that I/O interfaces 410A–P are all highlighted.

Figure 4D:
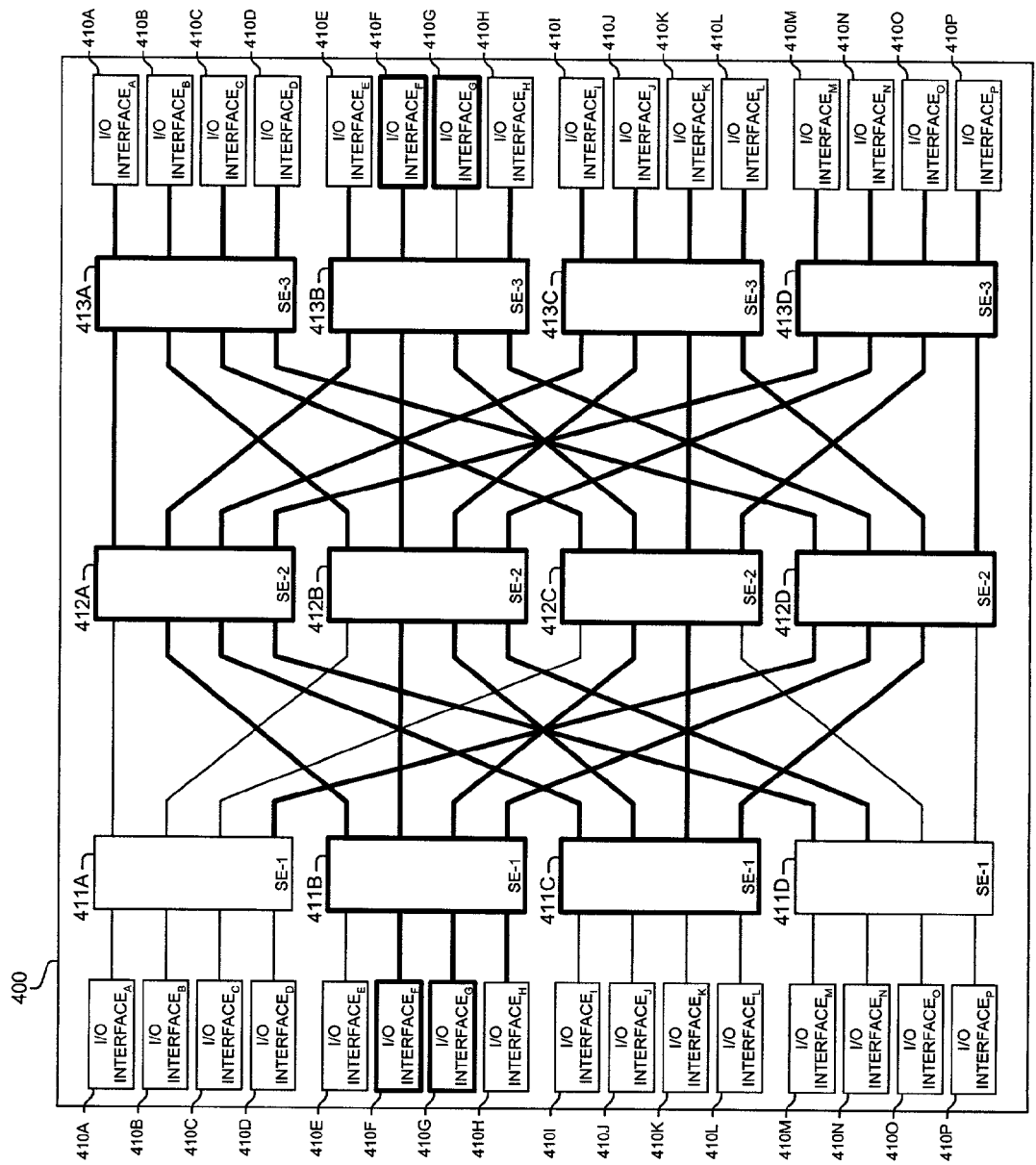
Figure 4E:
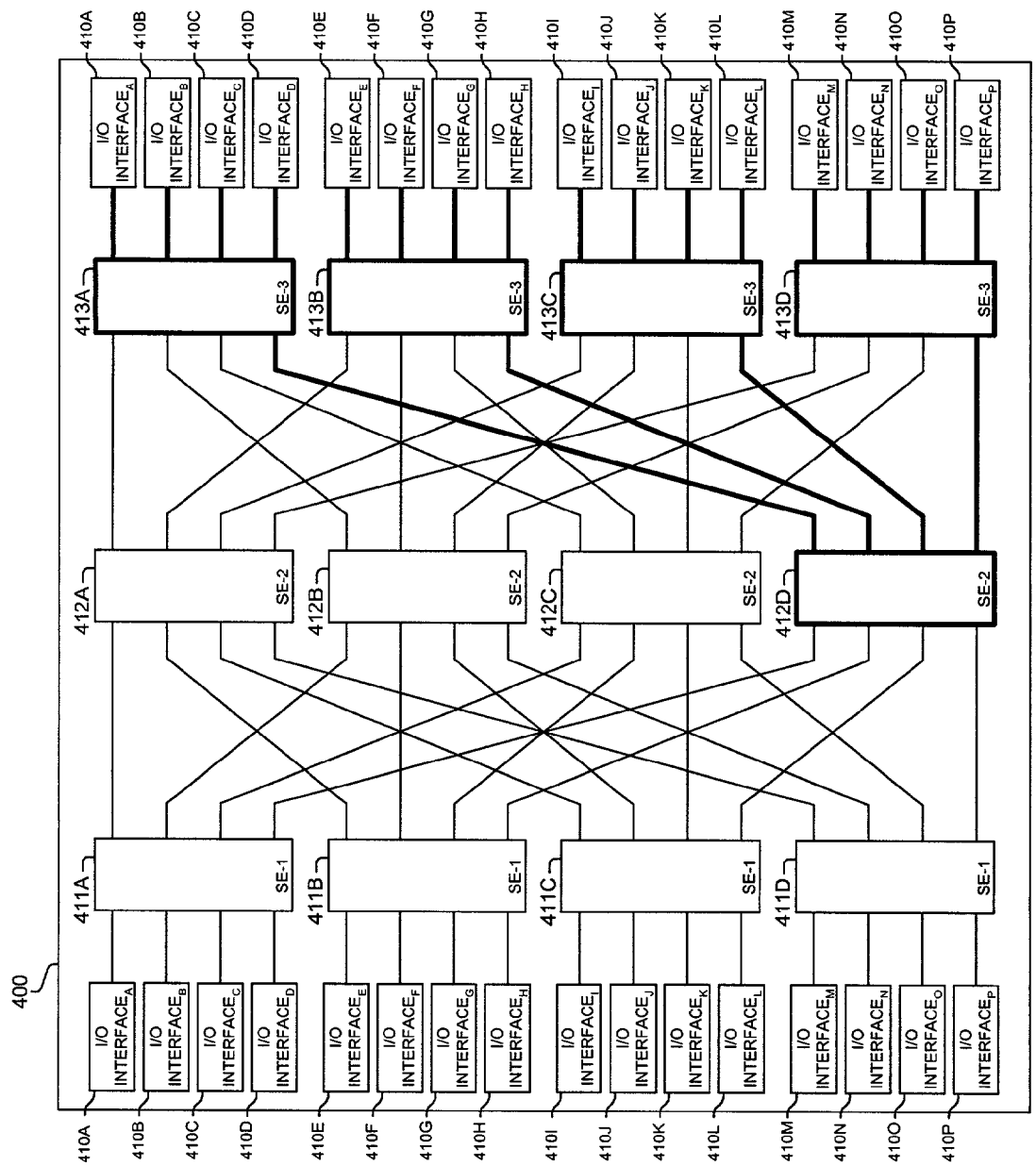

In one embodiment, the current barrier state is changed at this point as barrier requests have been received on the ingress portion over all links. In one embodiment, barrier acknowledgement phases and states are used before the current barrier state is changed, as one embodiment of such a technique is now described. As illustrated in FIG. 4D, I/O interfaces 410A–E, H–P are no longer highlighted to indicate that barrier acknowledgement messages are being propagated, and have been received over all input links of SE-1 411A, C–D, and over non-highlighted input links for SE-2's 412A–D. The barrier acknowledgements are further propagated in the same manner as illustrated by FIG. 4E, until all nodes receive the acknowledgement, with the representation shown in FIG. 4A next in this exemplary snapshot illustrations of series of barrier requests and acknowledgements.

Figure 5A:
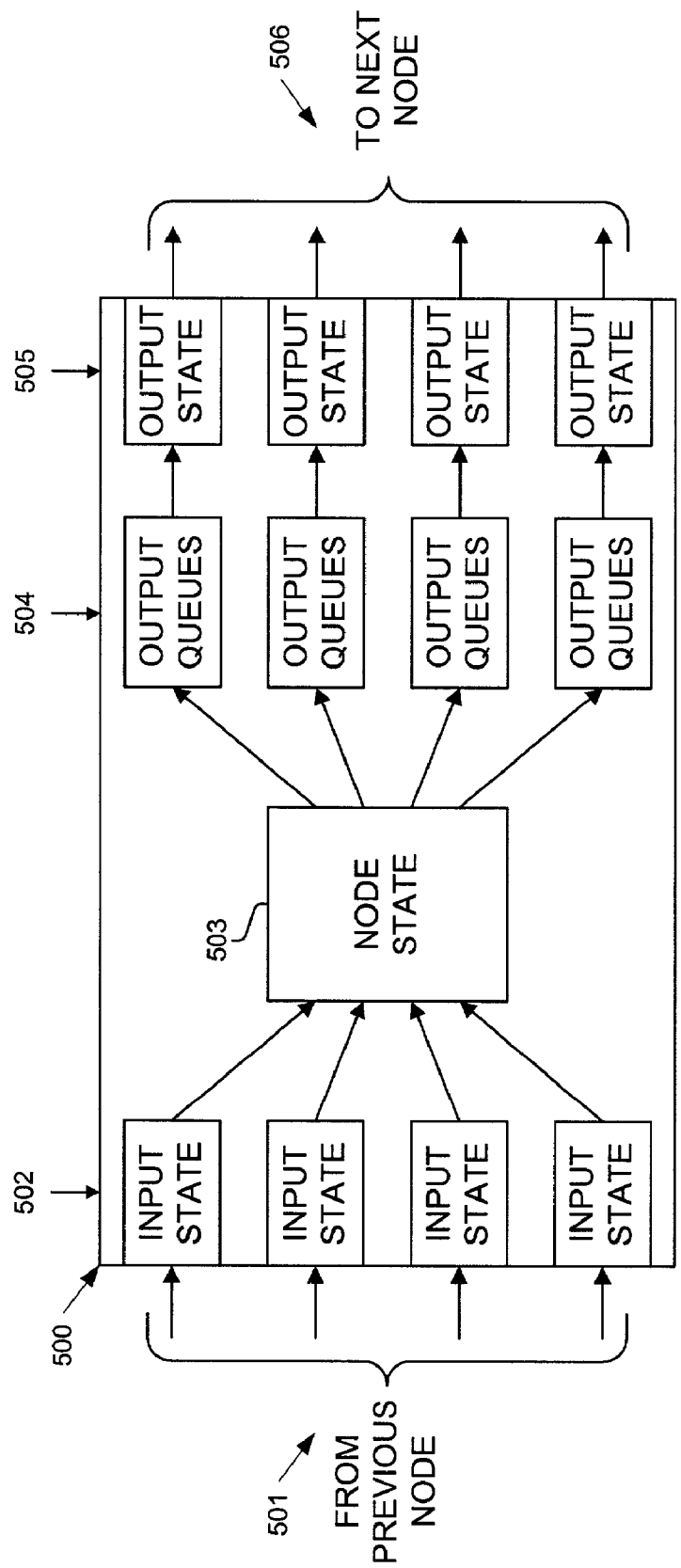
FIGS. 5A–B are block diagrams of logical embodiments of a node (e.g., switching element, input/output interface, etc.) for propagating barrier requests and acknowledgements.

FIG. 5A provides a logical block diagram of one embodiment of a node 500 (e.g., a switching element, I/O interface, line card, etc.) in terms on how it receives, processes, and propagates a barrier request for one barrier context. Each node 500 might have more than one barrier context operating currently, such as one for each priority and/or class of service. Barrier request messages or signals 501 are received from a previous node, with an input state 502 resulting for each input link. When an input state 502 has received the predetermined or requisite number of barrier requests, the particular input state 502 will relay a barrier request to node state 503. When node state 503 has received a barrier request from each input state 502, then node state 503 will propagate a predetermined number of barrier requests for each output by placing a barrier request message in each of the output queues. In one embodiment, an output queue is bypassed when the particular output queue is empty. When an output state 505 receives the predetermined requisite number of barrier requests from its corresponding output queue 504, the particular output state 505 relays the barrier request to a next node 506.

Figure 5B:
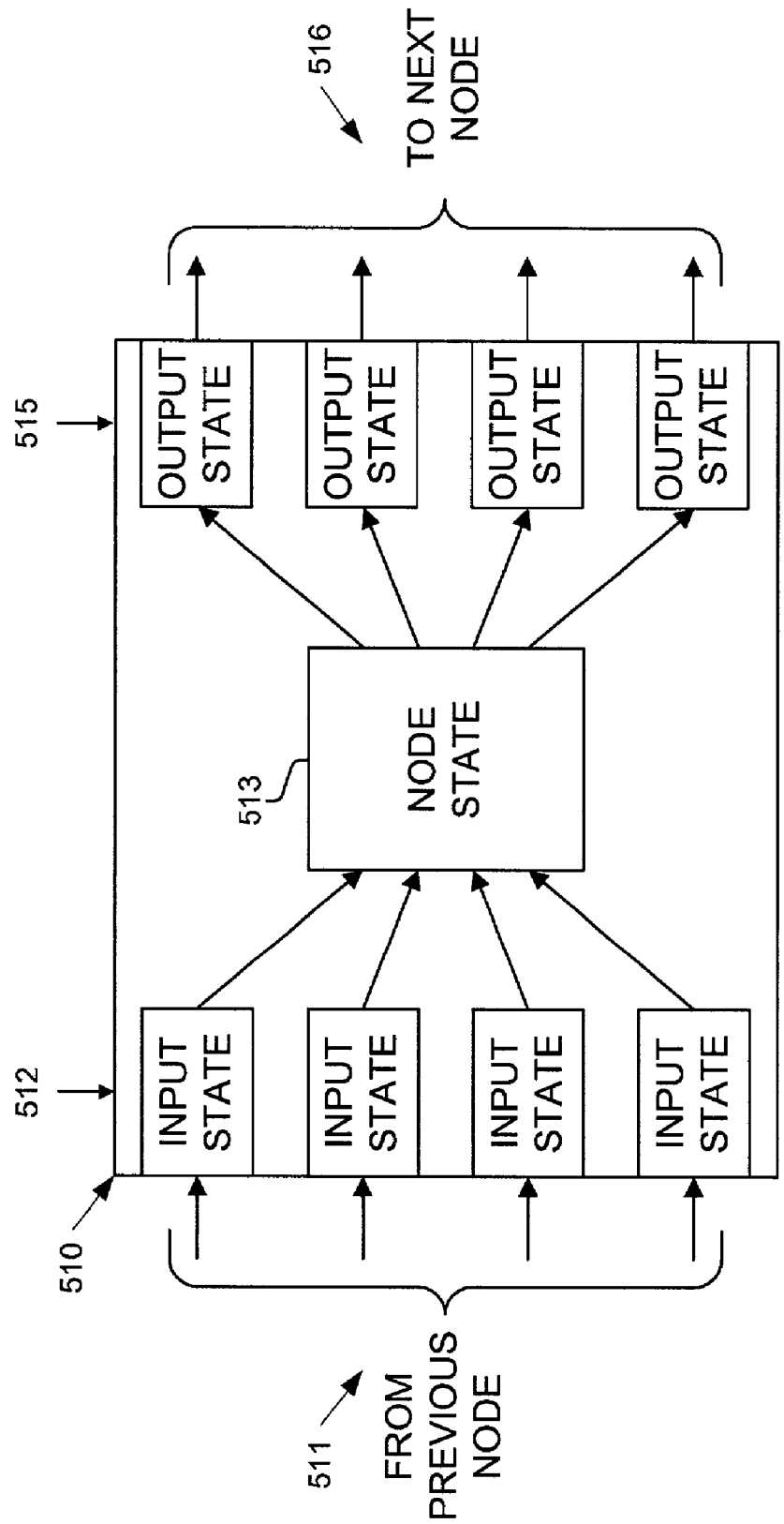

FIG. 5B provides a logical block diagram of one embodiment of a node 510 (e.g., a switching element, I/O interface, line card, etc.) in terms on how it receives, processes, and propagates a barrier request or barrier acknowledgement for one barrier context. Each node 510 might have more than one barrier context operating currently, such as one for each priority and/or class of service. Barrier requests or acknowledgement messages or signals 511 are received from a previous node, with an input state 512 resulting for each input link. When an input state 512 has received the predetermined or requisite number of barrier requests or acknowledgements, the particular input state 512 will relay the barrier acknowledgement request or barrier acknowledgment to node state 513. When node state 513 has received a barrier request or barrier acknowledgement from each input state 512, then node state 513 will propagate a predetermined number of barrier requests or barrier acknowledgements for each output by changing output state 515 to the barrier request or barrier acknowledgement state, with each of the particular output states 515 relaying the barrier request or barrier acknowledgement to a next node 516.

Figure 6A:
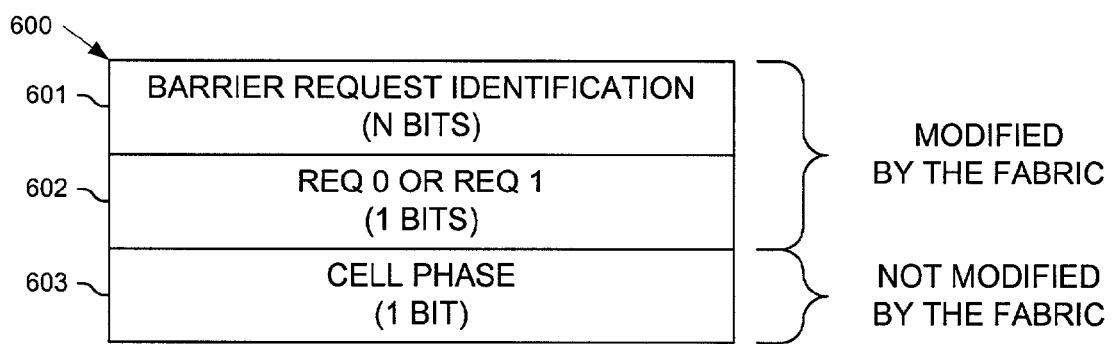
FIG. 6A is a block diagram of barrier fields included in data and/or control packets of one embodiment.

FIG. 6A is a block diagram of barrier fields 600 included in data and/or control packets of one embodiment which has $2^N$ possible different barrier phases and two barrier states (of course, other embodiments have different configurations). Rather than, or in addition to sending control packets or using barrier signals over control links, barrier request information may be included (e.g., piggybacked) in data packets. In one embodiment, every packet or a subset thereof includes two barrier request fields 601–602 and one field 603 identifying which of the two barrier states to which the packet belongs (i.e., the phase of a distribution element, the phase of the ingress part of an I/O interface, etc.). Barrier request identification field 601 identifies to which of the $2^N$ possible different barrier phases (e.g., sets of barrier states) the particular barrier request belongs. Barrier request field 602 identifies to which of two states (barrier request state zero, barrier request state one) the barrier request belongs. Many different embodiments of barrier information included in a packet or set over a control link are possible in keeping within the scope and spirit of the invention.

Figure 6B:
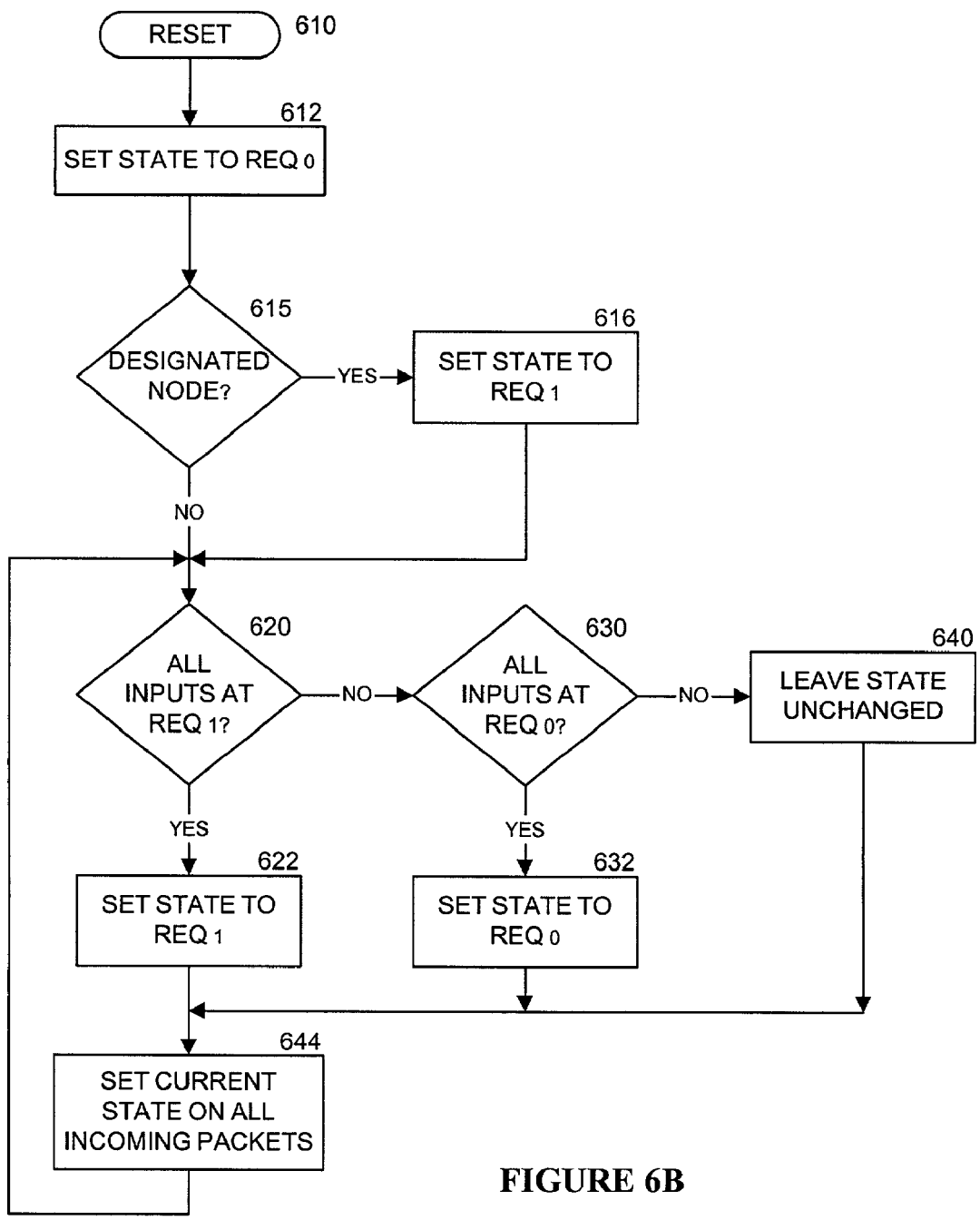
FIG. 6B is a flow diagram for updating barrier states in one embodiment.

FIG. 6B illustrates a flow diagram of one embodiment of a barrier scheme, including processing and propagating of barrier requests by nodes of a packet switching system. In one embodiment, each of the nodes (source, switching, destination) maintain their current barrier request state. Upon initialization, each of the nodes is set to barrier request 0 state. In another embodiment, a third (e.g., an idle state) is used upon initialization, which can transition into an operational state in numerous ways, including, but not limited to, waiting until all input links have transitioned, forcing a change after a predetermined delay if all the links have not transitioned, or via some external agent forcing the transition.

Processing of FIG. 6B begins at process block 610, and proceeds to process block 612 where the state of a node is initialized to barrier request 0 state. Next, as determined in process block 615, if the node is designated to initiate the barrier phase (e.g., a first stage of a switching fabric, or via some other assignment), then in process block 616, the state of the node is set to the barrier request 1 state. In this manner, the barrier phase switching will begin and the initialization of one embodiment is complete.

Then, processing of the received barrier requests and switching between barrier states begins. As determined in process block 620, if all the inputs of the node are in barrier request 1 state, then the state of the node is set to the barrier request 1 state in process block 622. Otherwise, as determined in process block 630, if all the inputs of the node are in barrier request 0 state, then the state of the node is set to the barrier request 0 state in process block 632. Otherwise the barrier state of the node remains unchanged as indicated by process block 640. As indicated by process block 644, the current barrier state is included on all incoming packets. It is this barrier state which will eventually propagate to a next node and be used to determine whether to switch barrier states. Also, in one embodiment, separate execution threads are used to update the barrier state and to add the barrier state to packets. Processing returns to process block 620 to repeat this processing.

Figure 7A:
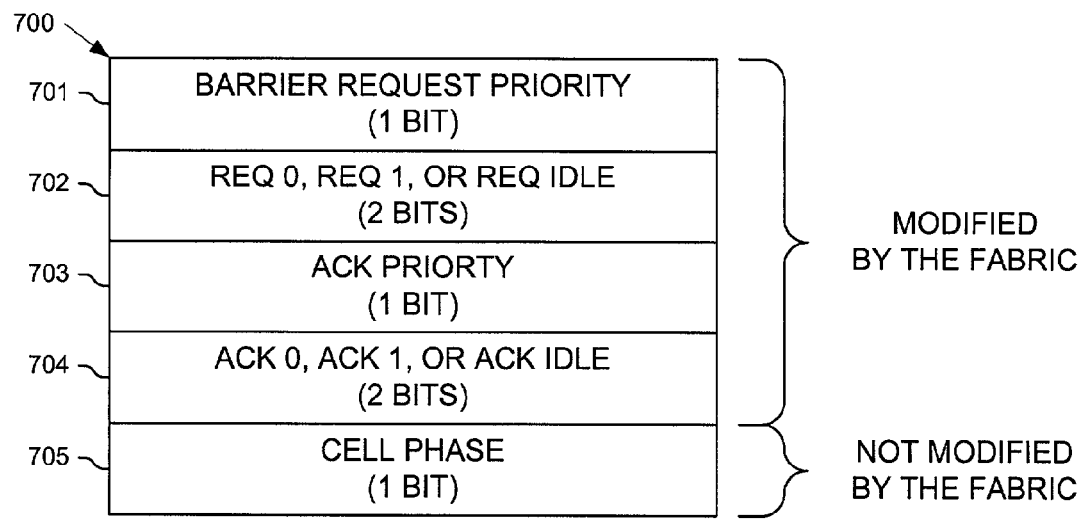
FIG. 7A is a block diagram of barrier fields included in data and/or control packets of one embodiment.

FIG. 7A is a block diagram of barrier fields 700 included in data and/or control packets of one embodiment which has two levels of priority and three barrier states. Rather than, or in addition to sending control packets or using barrier signals over control links, barrier request and acknowledgment information may be included (e.g., piggybacked) in data packets. In one embodiment, every packet or a subset thereof includes two barrier request fields 701–702, two barrier acknowledgement fields 703–704 and one field 705 identifying which of the two barrier states to which the packet belongs (i.e., the phase of a distribution element, the phase of the ingress part of an I/O interface, etc.). Barrier request priority field 701 identifies to which of two priorities or sets of barrier states the particular barrier request belongs. In one embodiment, field 705 is not used as the destinations may infer the barrier state of a packet from the received barrier transitions; however, this may induce additional delay and may result in the destination having to wait an additional barrier transition. Barrier request field 702 identifies to which of three states (barrier request initialization, barrier request state zero, barrier request state one) the barrier request belongs. Barrier acknowledgement field 703 identifies to which of two priorities or sets of barrier states the particular barrier acknowledgement belongs. Barrier acknowledgement field 704 identifies to which of three states (barrier acknowledgement initialization, barrier acknowledgement state zero, barrier acknowledgement state one) the barrier acknowledgement belongs. Many different embodiments of barrier information included in a packet or set over a control link are possible in keeping within the scope and spirit of the invention.

FIGS. 7B–G illustrate flow diagrams of one embodiment of a barrier scheme, including processing and propagating of barrier requests and acknowledgements by nodes of a packet switching system. In one embodiment, each of the nodes (source, switching, destination) maintains at least two operational states. The switching elements maintain a barrier request and a barrier acknowledgement state. The source nodes maintain a barrier request state and a barrier transmission acknowledgement state. The destination nodes maintain a barrier transmission acknowledgement state and a barrier receive acknowledgement state. Upon initialization, each of the nodes is set to an idle state which can transition into an operational state in numerous ways, including, but not limited to, waiting until all input links have transitioned, forcing a change after a predetermined delay if all the links have not transitioned, or via some external agent forcing the transition.

Figure 7B:
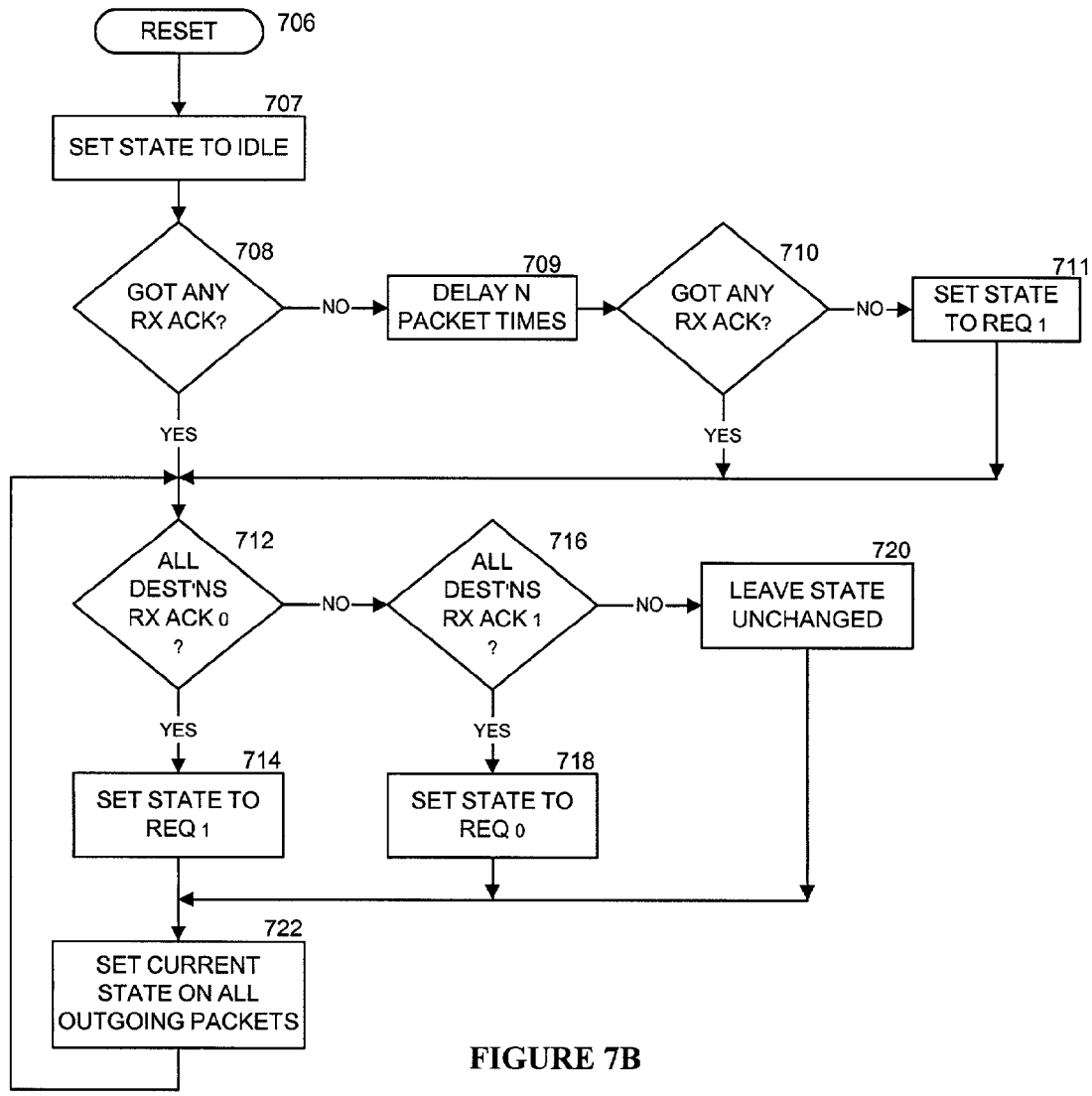
FIGS. 7B–7G are flow/state diagrams for updating barrier states in elements of one embodiment.

FIG. 7B illustrates one embodiment of barrier processing and propagation by a source node (e.g., a distribution node, an egress portion of an I/O interface, etc.) The process is reset in process block 706, and then proceeds to process block 707 to set the barrier request state of the source node is set to idle. Next in process block 708, if an acknowledgement has not been received from a destination node (e.g., a resequencing and/or reassembly element, an ingress portion of an I/O interface, etc.), then processing proceeds to process block 709 where a predetermined delay of is imposed to wait for an acknowledgement. Next, as determined in process block 710, if an acknowledgement still has not been received, then the barrier request state of the source node is set to state barrier request one (REQ-1) in process block 711. Processing proceeds in process block 712, where if the node has received all the predetermined number of barrier acknowledgement zero (ACK-0) messages, then the barrier request state of the source node is set to REQ-1. Otherwise, processing proceeds to process block 716, where if the node has received all the predetermined number of barrier acknowledgement one (ACK-1) messages, then the barrier request state of the source node is set to state barrier request zero (REQ-0) in process block 718. Otherwise, the state of the source node remains the same as indicated by process block 720. Process block 722 indicates that the value of the current state (REQ-0 or REQ-1) is placed in all outgoing packets. Processing then returns to process block 712.

Figure 7C:
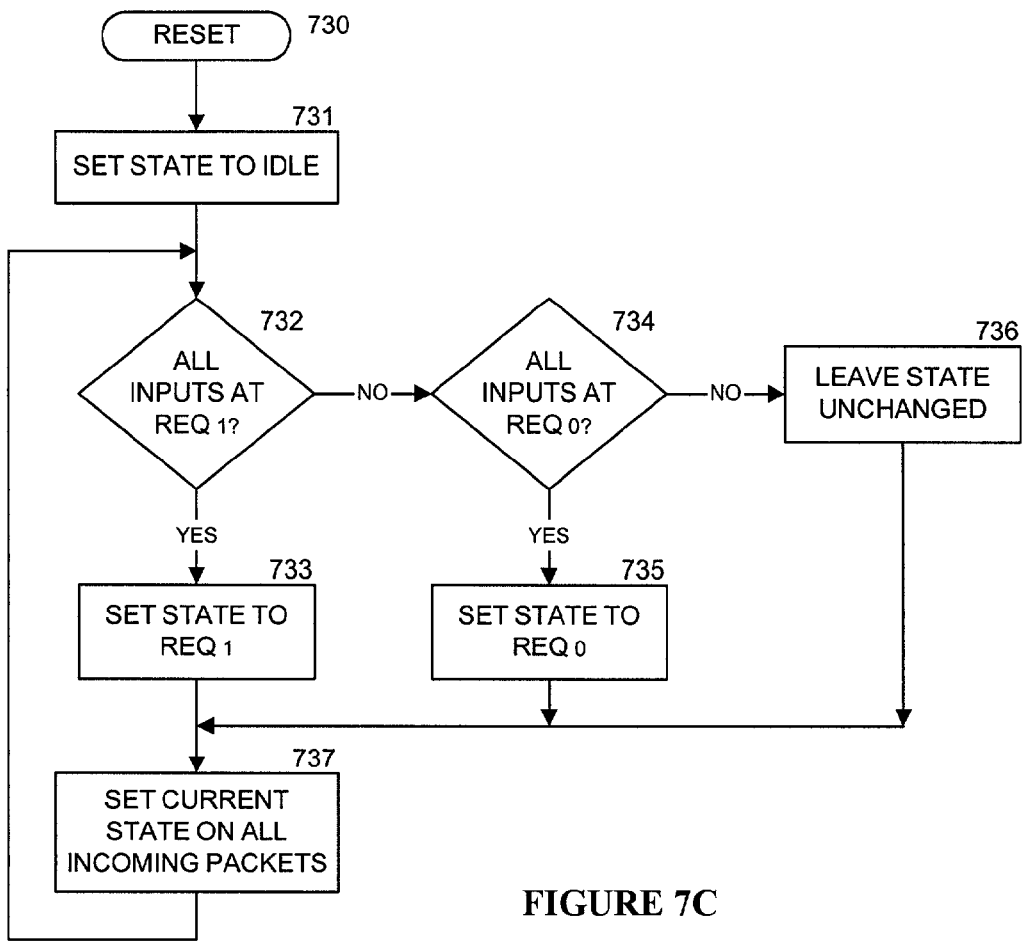

FIG. 7C illustrates one embodiment of barrier processing and propagation by a switching node. The process is reset in process block 730, and then proceeds to process block 731, where the current barrier request state of the switching node is set to idle. Next, as determined in process block 732, if all inputs are at state REQ-1, then the current barrier request state of the switching node is set to state REQ-1 in process block 733. Otherwise, as determined in process block 734, if all inputs are at state REQ-0, then the current barrier request state of the switching node is set to state REQ-0 in process block 735. Otherwise, the current barrier request state of the switching node is left unchanged as indicated in process block 736. The current barrier request state of the switching node is added on all incoming packets, as indicated in process block 737. In another embodiment, the current barrier request state of the switching node is added on all outgoing packets. Processing returns to process block 732.

Figure 7D:
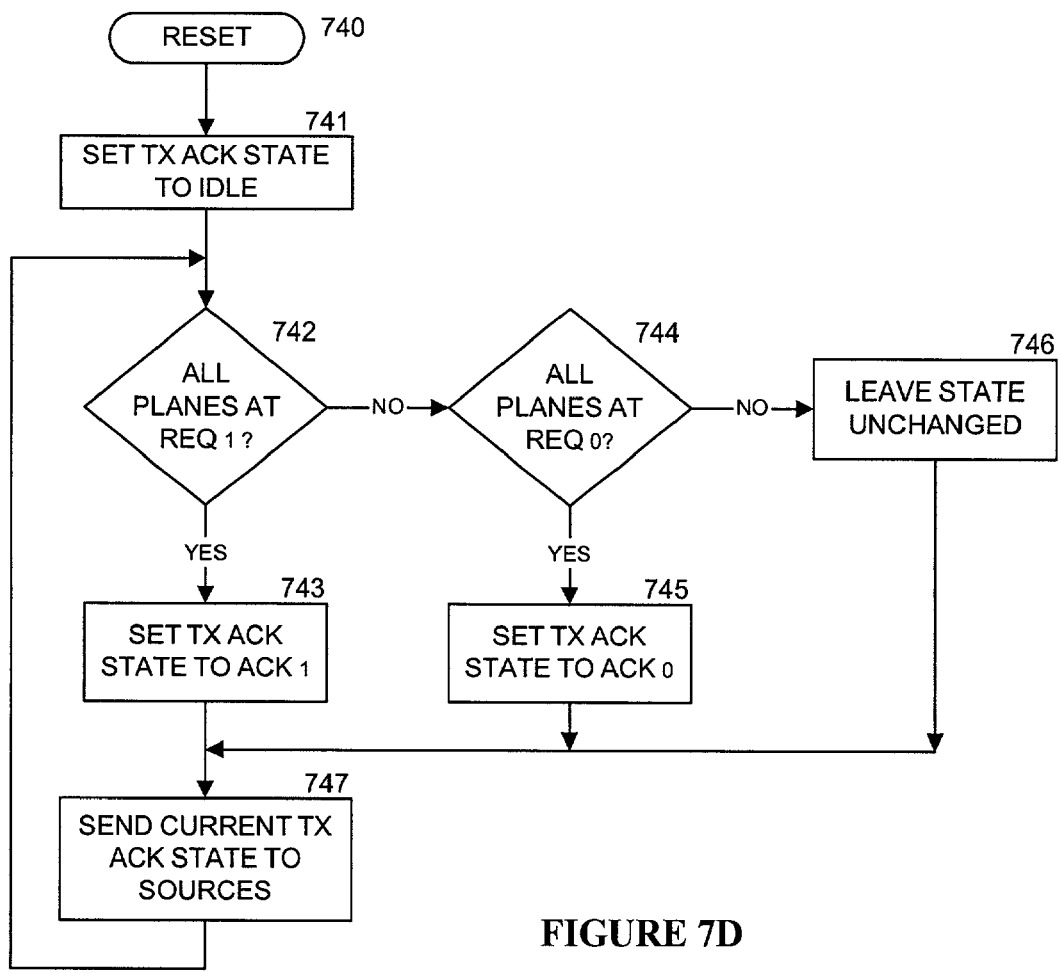

FIG. 7D illustrates one embodiment of barrier processing and propagation by a destination node. The process is reset in process block 740, and then proceeds to process block 741, where the barrier transmission acknowledgement state of the destination node is set to idle. Next, as determined in process block 742, if all planes (e.g. all inputs to the destination node) are at state REQ-1, then the barrier transmission acknowledgement state of the destination node is set to state ACK-1 in process block 743. Otherwise, as determined in process block 744, if all planes (e.g. all inputs to the destination node) are at state REQ-0, then the barrier transmission acknowledgement state of the destination node is set to state ACK-0 in process block 745. Otherwise, the barrier transmission acknowledgement state of the switching node is left unchanged as indicated in process block 746. The current barrier transmission acknowledgement state of the destination node is sent to all source nodes as indicated in process block 747. Processing returns to process block 742.

Figure 7E:
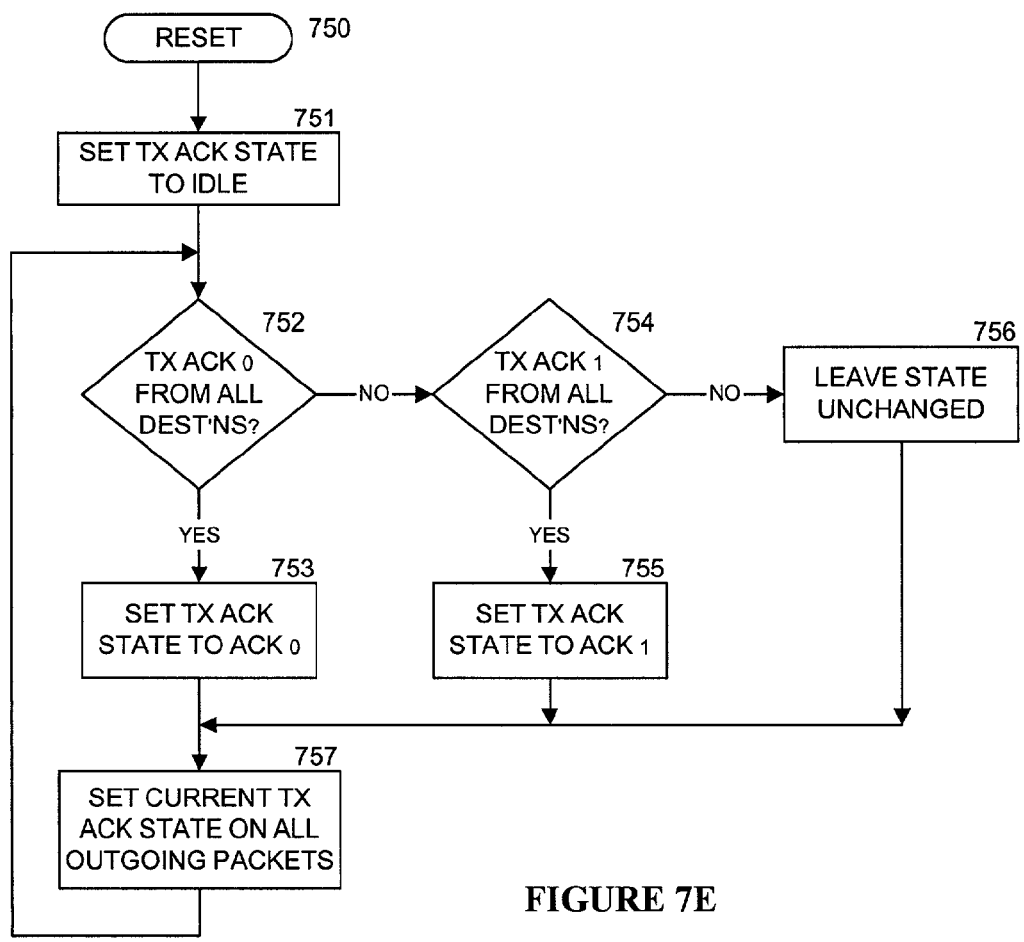

FIG. 7E further illustrates one embodiment of barrier processing and propagation by a source node. The process is reset in process block 750, and then proceeds to process block 751, where the barrier transmission acknowledgement state of the source node is set to idle. Next, as determined in process block 752, if all transmission acknowledgement messages of state ACK-0 have been received from all connected destination nodes, then the barrier transmission acknowledgement state of the source node is set to state ACK-0 in process block 753. Otherwise, as determined in process block 754, if all transmission acknowledgement messages of state ACK-1 have been received from all connected destination nodes, then the barrier transmission acknowledgement state of the source node is set to state ACK-1 in process block 755. Otherwise, the barrier transmission acknowledgement state of the source node is left unchanged as indicated in process block 756. The current barrier transmission acknowledgement state of the source node is included in all outgoing packets as indicated in process block 757. Processing returns to process block 752.

Figure 7F:
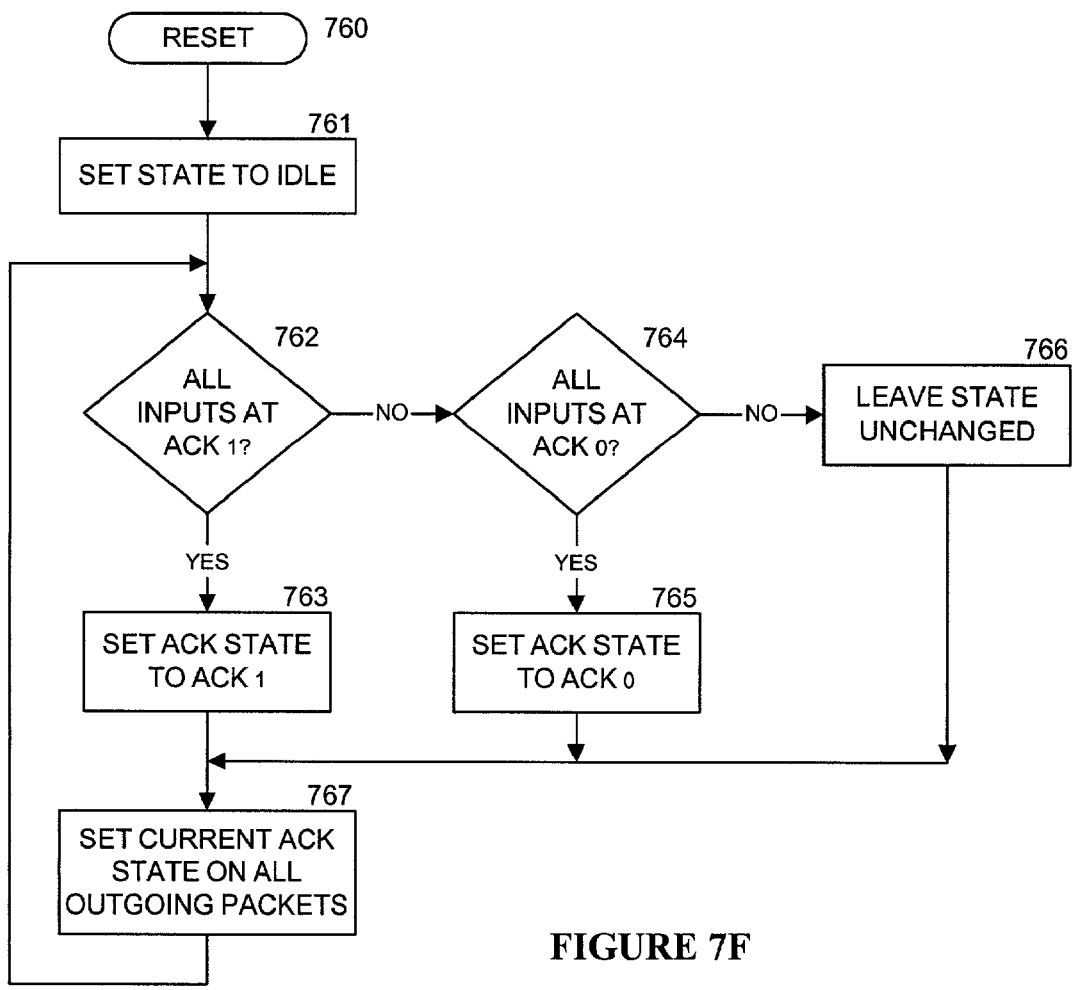

FIG. 7F further illustrates one embodiment of barrier processing and propagation by a switching node. The process is reset in process block 760, and then proceeds to process block 761, where the current barrier acknowledgement state of the switching node is set to idle. Next, as determined in process block 762, if all inputs are at state ACK-1, then the barrier acknowledgement state of the switching node is set to state ACK-1 in process block 763. Otherwise, as determined in process block 764, if all inputs are at state ACK-0, then the barrier acknowledgement state of the switching node is set to state ACK-0 in process block 765. Otherwise, the barrier acknowledgement state of the switching node is left unchanged as indicated in process block 766. The current barrier acknowledgement state of the switching node is added on all outgoing packets as indicated in process block 767. Processing returns to process block 762.

Figure 7G:
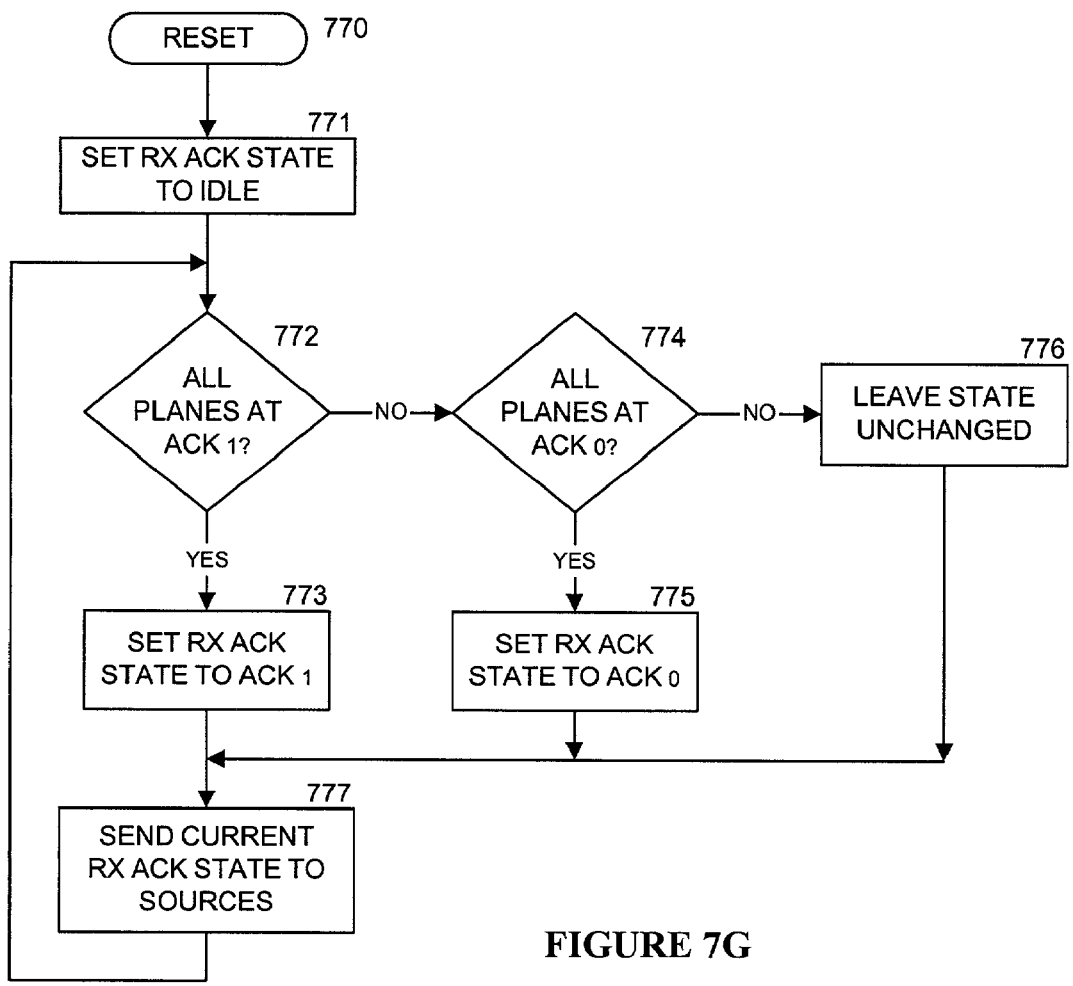

FIG. 7G further illustrates one embodiment of the processing of barrier acknowledgement messages for a destination node. The process is reset in process block 770, and then proceeds to process block 771, where the barrier receive acknowledgement state of the destination node is set to idle. Next, as determined in process block 772, if all planes (e.g. all inputs to the destination node) are at state ACK-1, then the barrier receive acknowledgement state of the destination node is set to state ACK-1 in process block 773. Otherwise, as determined in process block 774, if all planes (e.g. all inputs to the destination node) are at state ACK-0, then the barrier receive acknowledgement state of the destination node is set to state ACK-0 in process block 775. Otherwise, the barrier receive acknowledgement state of the switching node is left unchanged as indicated in process block 776. The current barrier receive acknowledgement state of the destination node is sent to all source nodes as indicated in process block 777. Processing returns to process block 772.

Figure 8A:
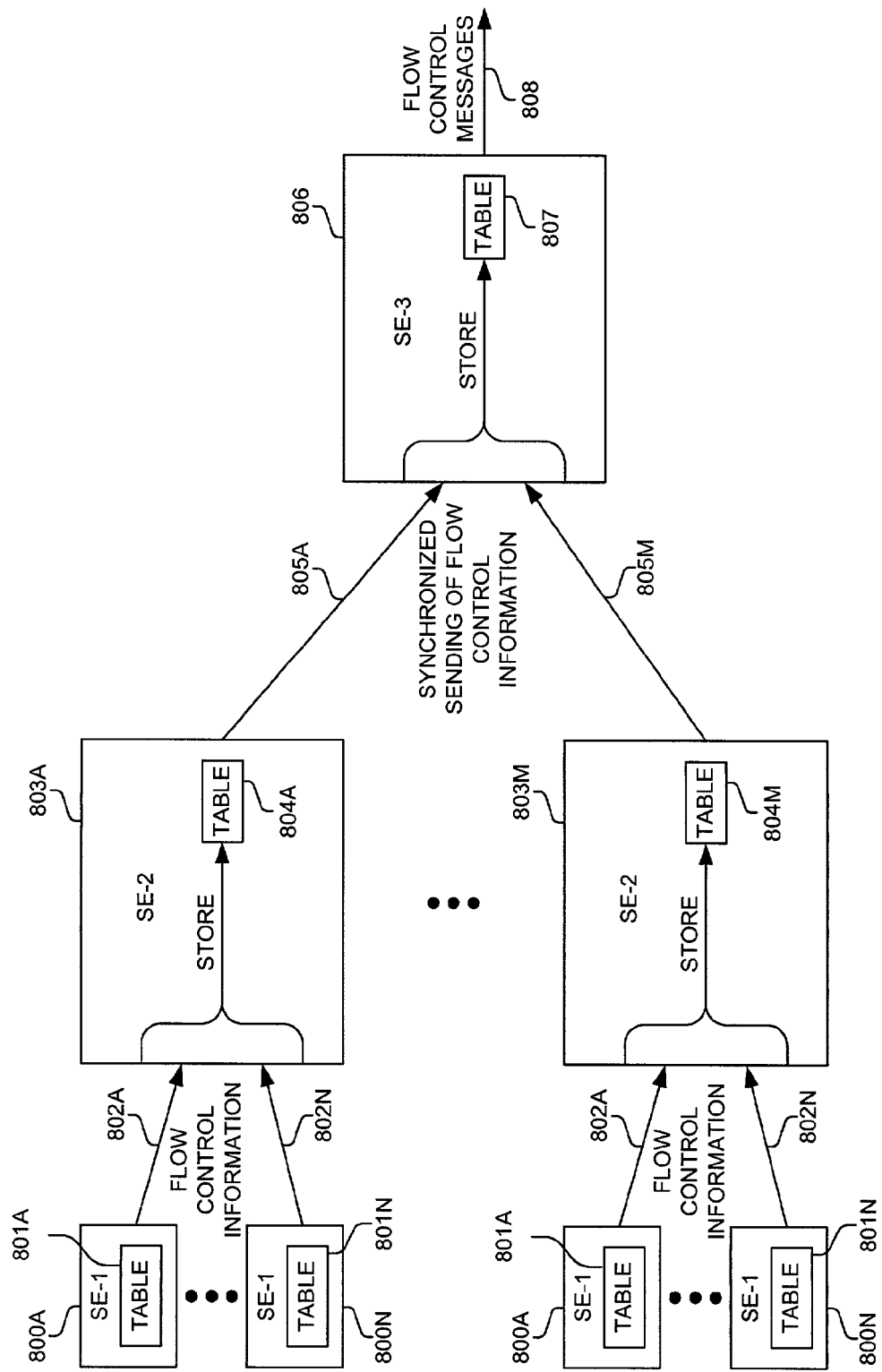
FIG. 8A is a logical block diagram illustrating one embodiment of distributing information in a packet switching system.

FIG. 8A illustrates a logical diagram of one embodiment using barrier phase synchronization for distributing information from each of the first stage switching elements (or another element) 800A–N to each of the second stage switching elements (or other element) 803A–M, and from each of the second stage switching elements 803A–M to a third stage switching element 806. Some embodiments use barrier phase synchronization for distributing information (including flow control information, data, other control information, etc.) from various components illustrated in FIGS. 1–3, and from third stage switching element 806 shown in FIG. 8A. Note, for ease of understanding, first stage switching elements 800A–N are shown twice, and only one third stage switching element 806 is shown while some embodiments use this process for updating all of their third stage switching elements. Also, in some embodiments, second stage switching elements 803A–M do not accumulate received information, but rather directly forward it downstream towards other components which typically accumulate and react to the flow control information.

As shown, each first stage switching element 800A–N maintains a data structure, such as table 801A–N (respectively) of flow control information which is communicated over links 802A–N to second stage switching elements 803A–M, which updates their flow control data structures, such as tables 804A–M. In one embodiment, the information stored in each table 804A–M is approximately the same. Using barrier phase transitions to synchronize the transmission of flow control information, second stage switching elements 803A–M to concurrently (or approximately concurrently) transmit different portions of their respective table 801A–M to third stage switching element 806 over links 805A–M. Third stage switching element 806 receives this information, updates its data structure (e.g., table 807), and can use this collected information to generate reactive flow control messages 808. The operation of the synchronized transmission of flow control information of one embodiment is further described in relation to FIGS. 8B–8E.

Figure 8B:
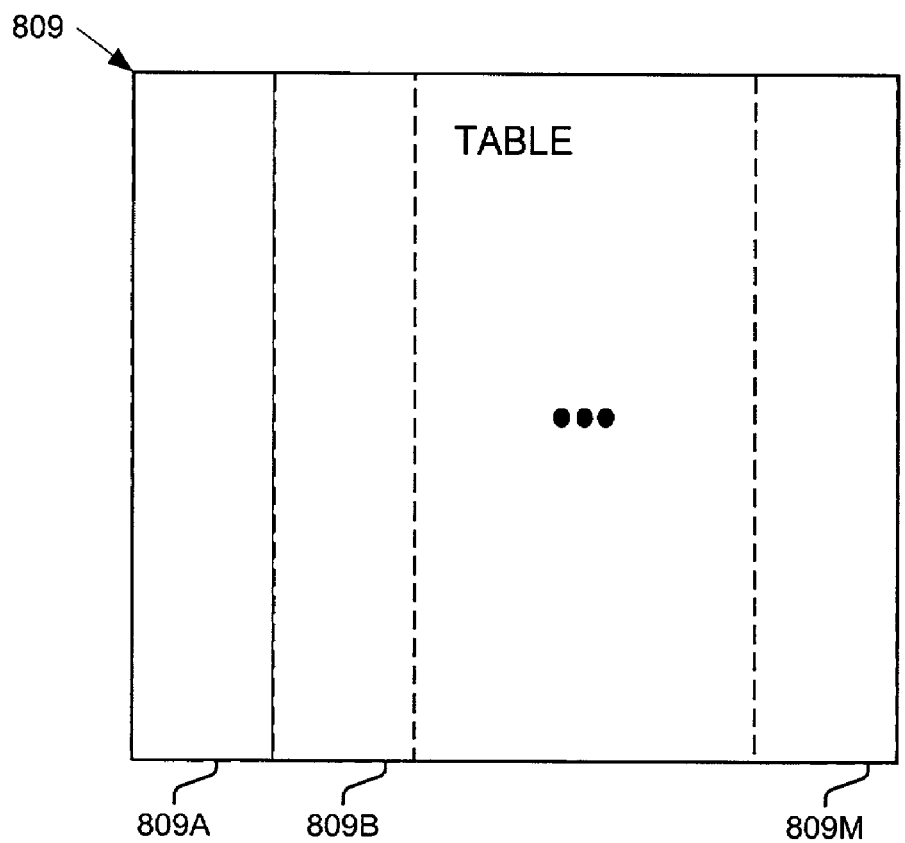
FIG. 8B is one example of a partitioning of an information table for distribution.

FIG. 8B illustrates an exemplary partitioning of a data structure (table 809) into several data segments labeled 809A–M. In one embodiment, table 809 corresponds to each of tables 804A–M shown in FIG. 8A. These partitions 809A–M can be sent concurrently by different components, and then each component sequences to a next partition 809A–M and sends that, etc.

Figure 8C:
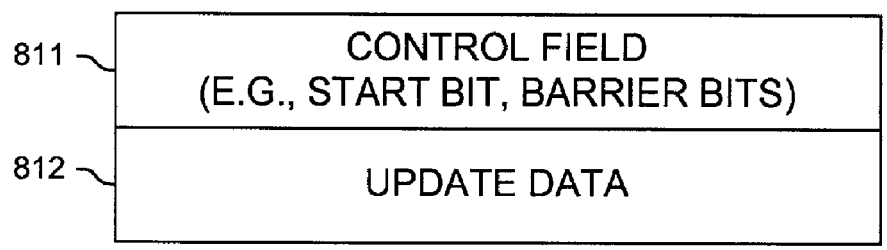
FIG. 8C illustrates packet fields used to distribute information in one embodiment.

FIG. 8C illustrates a set of packet fields 811–812 which are used in one embodiment for transmitting the information. In one embodiment, control field 811 indicates an address to which the data belongs and update data field 812 contains the information being transmitted. Embodiments send these fields 811–812 in various fashions, including piggybacking them in other transmitted control and/or data packets, or as a separate packet.

In one embodiment control field 811 specifies a beginning address corresponding to the position in a data structure to which the information in update data field 812 belongs. However, the full address may require several bits or bytes, so some embodiments encode a synchronization pattern from which the address of the data may be interpreted. For example, in one embodiment, each transmitting element of a barrier group is assigned a predetermined offset value, which indicates a portion of data to begin sending at the barrier phase synchronization point. The receiving elements are also programmed with this information and they know the sender of each received information. Therefore, by including in control field 811 a single start bit which is set on the first portion of information sent at the at the barrier phase synchronization point and by keeping a packet update count for each sender, the receiver can readily determine the address for each received update data field 812.

In one embodiment, control field 811 further includes a single barrier bit which is inverted on each barrier transition such that a receiver should only see a change in the barrier bit in a packet with the start bit set in control field 811. In one embodiment, the receiver ignores the received update data 812 until a control field 811 is received with a start bit and a changed barrier bit. In one embodiment, the receiver only waits for a start bit. In one embodiment, the barrier bit is inverted every time the start bit is asserted in control filed 811.

In one embodiment, a cell loss detection mechanism combines with the barrier bits and start bits to allow inferring the state of the start bit in missing cells. Anytime a single cell is lost, the barrier state and start bit on the next received cell indicates to the receiver whether a start bit was dropped or a middle update was dropped, which decreases or eliminates possible aliasing. If the barrier state has changed from the last received update but the start bit is not asserted, an update with the start bit asserted was dropped. If the barrier state is the same, a middle update was dropped. When the start bit is asserted, irrespective of the current barrier state, the receiver writes the update at the programmed offset and continues.

In one embodiment, as soon as two consecutive cells are dropped, the receiver waits for the next assertion of the start bit. Additionally, one embodiment lengthens the number of cells taken by the update and lengthens the minimum number of cells between the assertion of the start bit. In general, if the minimum of these two values is n, then the possibility of aliasing is eliminated when up to n−1 consecutive cells are dropped.

Figure 8D:
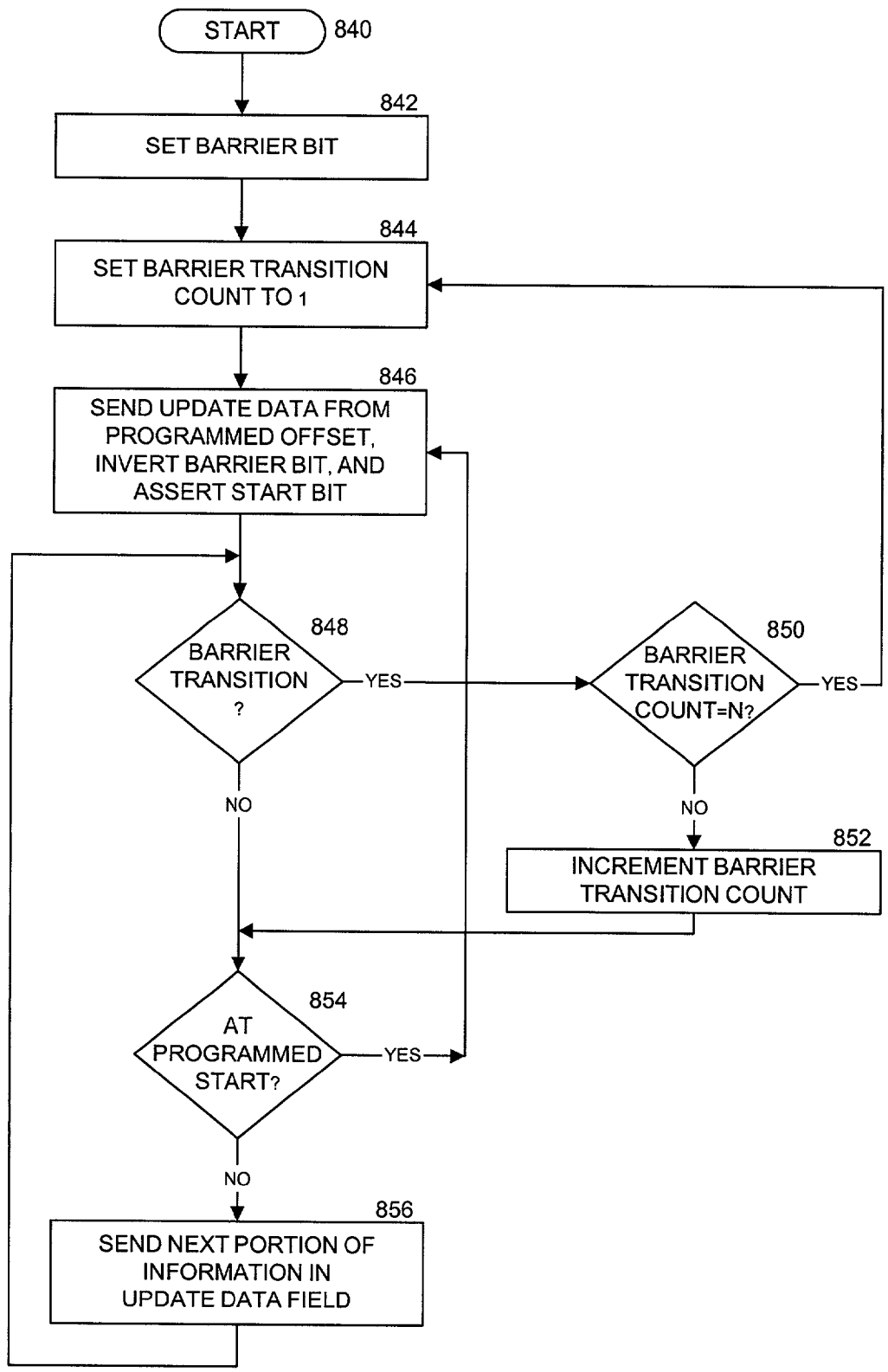
FIG. 8D is a flow diagram illustrating one embodiment of a process for distributing information.

FIG. 8D illustrates a flow diagram of one embodiment of a process for distributing information. Processing begins at process block 840, and proceeds to process block 842 where the barrier bit is initialized to one. Next, in process block 844, a barrier transition count is set to one. Next, in process block 846, information at the programmed offset is sent (e.g., in update data field 812), the barrier bit is inverted, and the start bit is asserted (e.g., in control field 811). Next, as determined in process block 848, if a barrier transition has occurred, then if it is the Nth barrier transition since the last reset of the barrier transition count as determined in process block 850, then processing returns to process block 844; otherwise, the barrier transition count is incremented in process block 852. This use of the barrier transition count accommodates barrier phase transitions, especially those whose phase transition rate exceeds the time required to send all the information in the data structure. If a barrier transition has not occurred as determined in process block 848, then if the next information to send is at the programmed start as determined in process block 854, then processing returns to process block 846. Otherwise, the next portion of the information is sent in the update data field 812, and processing returns to process block 848.

Figure 8E:
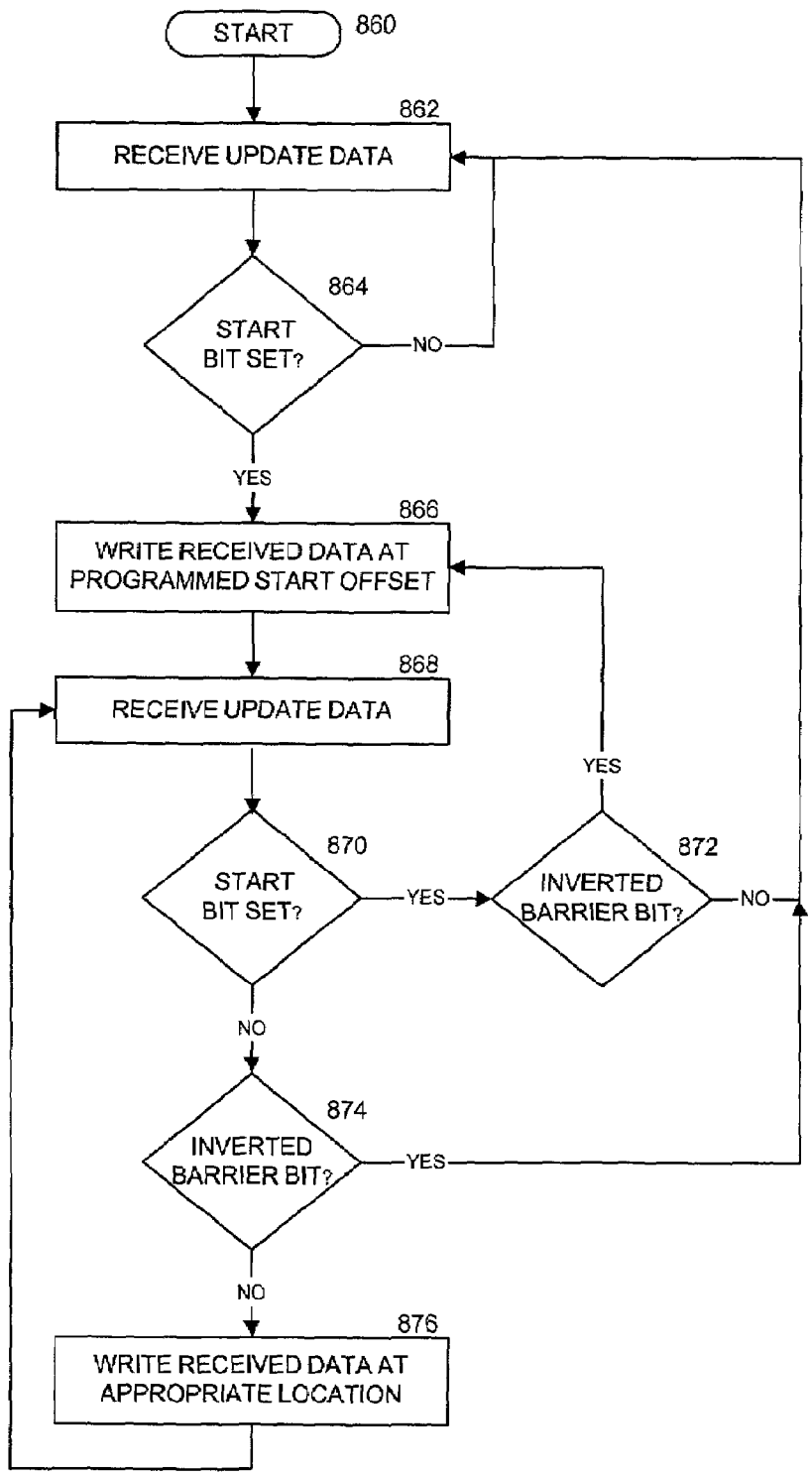
FIG. 8E is a flow diagram illustrating one embodiment of a process for updating its data structure in response to received distributing information.

FIG. 8E illustrates a flow diagram of one embodiment of a process for updating its data structure in response to received distributing information. Processing begins at process block 860, and proceeds to process block 862 wherein the update data is received. Next, as determined in process block 864, if the start bit in not set, then processing returns to process block 862 to wait for the set start bit. Otherwise, the received data is stored in the data structure at the programmed offset location in process block 866. Next, in process block 868 the next portion of update data is received. If the received start bit is set as determined in process block 870, then if the barrier bit was inverted (e.g., no error) as determined in process block 872, processing returns to process block 866; otherwise, an error has occurred and processing returns to process block 862 for the receiver to reset. Otherwise, the start bit was determined to not have been set in process block 870, and if the barrier bit was inverted (e.g., an error condition), processing returns to process block 862 for the receiver to reset. Otherwise, the received update data is stored in the next memory location in the data structure and processing returns to process block 876 to receive more update data.

In one embodiment, the process illustrated in FIG. 8E reacts to the detection of a lost cell. For example, if a lost cell is detected, then the barrier bit with the next cell is evaluated if the start bit is not asserted. If the battier transitioned, then the next cell is written to the programmed offset plus one. If it has not, it is written to the previously written entry plus two (e.g., instead of the usual previously written entry plus one.)

Figure 9A:
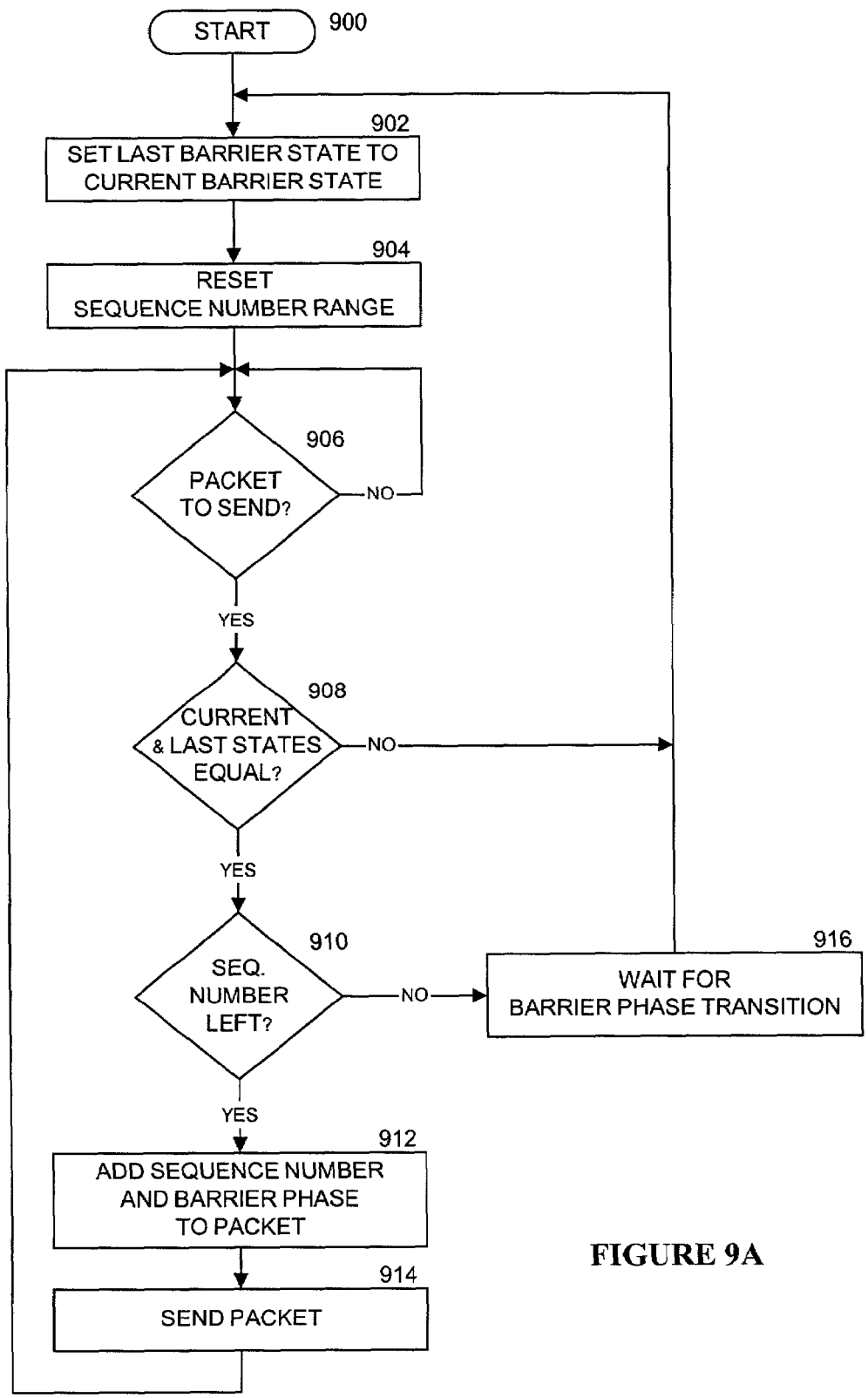
FIG. 9A is a flow diagram illustrating one embodiment of a process of a source node adding sequence numbers to packets in accordance with a barrier state of the source node.

FIG. 9A illustrates a flow diagram of one embodiment of a process of a source node adding sequence numbers to packets in accordance with a barrier state of the source node. Processing begins at process block 900, and proceeds to process block 902 where the last barrier state variable is set to the current barrier state. In process block 904, the sequence number range for use within a packet phase is reset. Until there is a packet to send, processing loops at process block 906. Next, if the current barrier state and state stored in the last barrier state variable are not equal as determined in process block 908, then processing returns to process block 902 to reset and reuse the sequence number space for the current barrier phase. Otherwise, if there are sequence numbers remaining in the sequence number space available to the current barrier phase as determined in process block 910, then the next sequence number and current barrier phase is added to the packet in process block 912, the packet is sent in process block 914, and processing returns to process block 906 to handle more packets. Otherwise, if in process block 910 it was determined that the sequence number space has been exhausted for the current barrier phase, then processing waits for a barrier phase transition in process block 916, which then allows processing to return to process block 902 to reset and reuse the sequence number space for the new current barrier phase.

In other embodiments, rather than resetting a sequence number space, a counting space is reset to limit the number of packets sent in a barrier phase. These embodiments may be particularly useful when sequence numbers are not added to packets, such as in an embodiment which uses time stamps to resequence streams of packets at a destination. In certain of these embodiments, the counting space would be reset in process block 904, the counter would be checked in process block 910, and a timestamp would be added in process block 912 or process block 912 would not be performed. Additionally, one embodiment does not include the barrier phase in the packet such as that indicated as added in process block 912. In this embodiment, the destinations may infer the barrier state of a packet from the received barrier transitions; however, this may induce additional delay and may result in the destination having to wait an additional barrier transition.

Figure 9B:
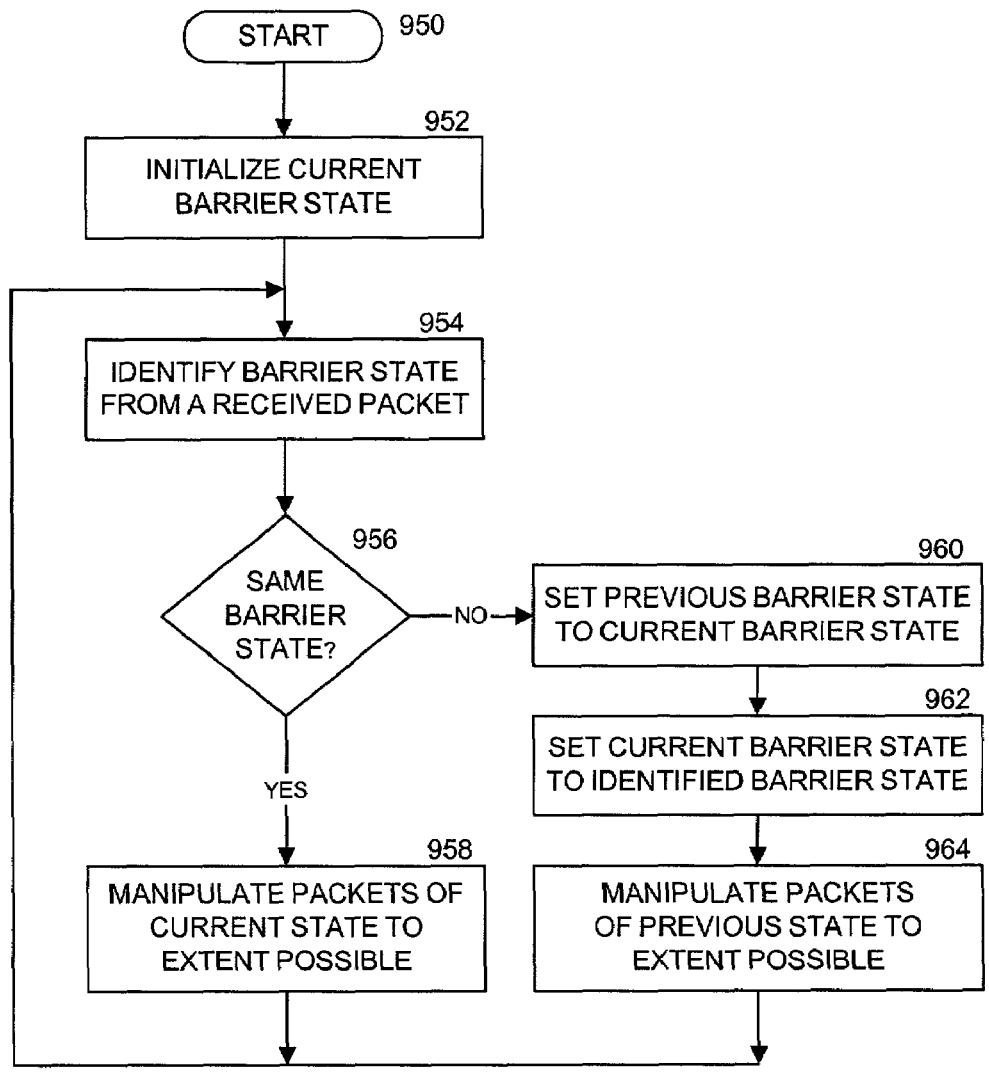
FIG. 9B is a flow diagram illustrating one embodiment of a process of a destination node manipulating packets in accordance with a barrier state of the packets and destination node.

FIG. 9B illustrates a flow diagram of one embodiment of a process of a destination node manipulating packets in accordance with a barrier state of the packets and destination node. Other processes, such as receiving packets and processing and propagating barrier requests are not included in this process, but are rather being performed concurrently in one embodiment. Processing begins at process block 950, and proceeds to process block 952 where the current barrier state of the destination node is initialized. Next, in process block 954, the barrier state of a received packet is identified. Next, as determined in process block 956, if the barrier states of the destination node and the received packet are the same, then processing proceeds to process block 958 wherein the packets having the current state are manipulated to the extent possible. For example, packets can be resequenced, reassembled, output queued, and/or sent out if, for example, the requisite sequence numbers have been received by the destination node. At this point, the destination node does not know whether more packets will be received having the current barrier state, which may effect this manipulation. Otherwise, processing proceeds to process block 960, where the previous state is set to the current state. In process block 962, the current state is updated to reflect the identified state of the received packet. Next, in process block 964, the packets belonging to the previous barrier state are manipulated to the extent possible, as the destination node knows that no packets will be subsequently received which are identified with the previous barrier state. In many instances, all packets belonging to the previous barrier state may be manipulated in process block 964. However, for example, in the case of reassembling of a larger packet comprised of several packets of different barrier states sent through a packet switching system, the packet switching system may be required to wait an additional number of barrier phase transitions before being able to determine that one or more of its packets have been lost or discarded. Processing then returns to process block 954.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. A method for updating a data structure, the method comprising:
   receiving a barrier bit;
   receiving a start bit;
   resetting a current data structure address to a predetermined address within the data structure in response to receiving the barrier bit and receiving the start bit;
   receiving a plurality of data units;
   updating the current data structure based on the received plurality of data units; and
   advancing the current data structure address to a next location for storing a data unit.

2. The method of claim 1, wherein identifying the barrier phase transition includes maintaining a current barrier state, and receiving a new barrier state indication different than the current barrier state.

3. The method of claim 1, further comprising maintaining a current barrier bit state and comparing the current barrier bit state with a value of the received barrier bit.

4. The method of claim 1, wherein the plurality of data units include flow control information.

5. A packet switching system performing the method of claim 1.

6. A packet switching element performing the method of claim 1.

7. An apparatus for updating a data structure, the apparatus comprising:
   means for receiving a barrier bit;
   means for receiving a start bit;
   means for resetting a current data structure address to a predetermined address within the data structure in response to receiving the barrier bit and receiving the start bit;
   means for receiving a plurality of data units;
   means for updating the current data structure based on the received plurality of data units; and
   means for advancing the current data structure address to a next location for storing a data unit.

8. The apparatus of claim 7, comprising means for maintaining a current barrier state, and means for receiving a new barrier state indication different than the current barrier state.

9. The apparatus of claim 7, comprising means for maintaining a current barrier bit state and means for comparing the current barrier bit state with a value of the received barrier bit.

10. The apparatus of claim 7, wherein the plurality of data units include flow control information.

11. A packet switching system comprising:
    a plurality of first elements;
    a plurality of second elements;
    wherein each of the plurality of first elements includes:
    a memory configured to store a first data structure;
    a first barrier state maintainer to indicate a current first barrier state;
    a first barrier accumulator to receive indications of a first subset of a plurality of barrier request messages, to determine when a first barrier request may be sent to the plurality of second elements, and to update the current first barrier state; and
    a first data forwarder for sending information maintained in the first data structure to the plurality of second elements.

12. The packet switching system of claim 11, wherein each of the plurality of second elements includes:
    a second memory configured to store a second data structure;

a second barrier state maintainer to indicate a current second barrier state;

a second barrier accumulator to receive indications of a second subset of a plurality of barrier request messages, to determine when a second barrier request may be sent to a plurality of third elements, and to update the current second barrier state; and a second data forwarder for sending information maintained in the second data structure in a predetermined order to the plurality of third elements, wherein the predetermined order is reset in response to identifying a barrier state transition.

13. The packet switching system of claim 12, wherein each of the plurality of third elements includes:

a third memory configured to store a third data structure;

a third barrier state maintainer to indicate a current third barrier state;

a third barrier accumulator to receive indications of a third subset of a plurality of barrier request messages, to determine when a third barrier request may be sent, and to update the current third barrier state.

14. The packet switching system of claim 11, wherein each of the plurality of second elements includes a second data forwarder for sending said first data structure information received from the plurality of first elements to a plurality of third elements.

15. The packet switching system of claim 14, wherein each of the plurality of first elements, the plurality of second elements, and the plurality of third elements is a switching element.

16. The packet switching system of claim 11, wherein each of the plurality of first elements is a switching element.

17. The packet switching system of claim 16, wherein each of the plurality of second elements is a switching element.

* * * * *